(12) United States Patent
Lewis

(10) Patent No.: US 8,125,620 B2
(45) Date of Patent: Feb. 28, 2012

(54) OPTICAL SENSOR DEVICE

(75) Inventor: Robert Alden Lewis, Bend, OR (US)

(73) Assignee: PulsedLight, LLC, Bend, OR (US)

( * ) Notice: Subject to any disclaimer, the term of this patent is extended or adjusted under 35 U.S.C. 154(b) by 4 days.

(21) Appl. No.: 12/288,305

(22) Filed: Oct. 17, 2008

(65) Prior Publication Data

US 2010/0026984 A1 Feb. 4, 2010

Related U.S. Application Data

(60) Provisional application No. 60/999,830, filed on Oct. 18, 2007.

(51) Int. Cl.
*G01C 3/08* (2006.01)

(52) U.S. Cl. ...................... 356/5.01; 356/5.07

(58) Field of Classification Search ............ 356/4.01, 356/5.01, 5.07, 5.08, 5.15, 28
See application file for complete search history.

(56) References Cited

U.S. PATENT DOCUMENTS

| | | | | |
|---|---|---|---|---|
| 4,129,827 A * | 12/1978 | Southwick | ................ | 324/76.14 |
| 4,985,844 A * | 1/1991 | Foley et al. | ................ | 702/180 |
| 5,637,994 A * | 6/1997 | Carder | ................ | 324/76.13 |
| 5,852,491 A * | 12/1998 | Kato | ................ | 356/5.01 |
| 6,225,943 B1 * | 5/2001 | Curley et al. | ................ | 342/137 |
| 6,587,187 B2 * | 7/2003 | Watanabe et al. | ................ | 356/5.01 |
| 7,280,069 B2 * | 10/2007 | Honya et al. | ................ | 342/135 |
| 2004/0070746 A1 * | 4/2004 | Lewis et al. | ................ | 356/5.01 |
| 2008/0088818 A1 * | 4/2008 | Mori | ................ | 356/5.1 |

* cited by examiner

*Primary Examiner* — Isam Alsomiri
(74) *Attorney, Agent, or Firm* — Klarquist Sparkman, LLP

(57) ABSTRACT

A method and apparatus for the acquisition of repetitive signals in a sensing device comprising a transmitter, a receiver and an object. The transmitter repetitively emits a modulated electro-magnetic signal into a transmission medium, with the emitted signal interacting with the object producing a counter propagating return signal. The return signal may contain properties that reflect all, or a portion, of the initial signal or may be correlated with said signal through a process of absorption and reemission, in which reflected signal characteristics are governed by the object's physical material characteristic. The return signal is detected and converted into digital signals by a receiver via a reception channel through the use of edge transitions rather than logic levels from one or more comparator outputs to reconstruct the return signal waveform. A several waveform acquisition and reconstruction methods are disclosed for use with an edge sampling detection apparatus. When directed towards the time-of-flight distance measurement the invention also discloses a useful method to provide optical feedback using a moving waveguide.

19 Claims, 39 Drawing Sheets

| Input State | Rising | Falling |
|---|---|---|
| 00 | 0 | 0 |
| 01 | 0 | 1 |
| 10 | 1 | 0 |
| 11 | 0 | 0 |

Count Time Interval

OPTICAL SENSOR DEVICE

This application claims the benefit of U.S. Provisional Application No. 60/999,830 entitled "Optical Sensor Device" filed on Oct. 18, 2007, which is incorporated herein by reference.

BACKGROUND OF THE INVENTION

1. Field of the Invention

The present invention is directed towards the time-of-flight distance measurement.

2. Description of Related Art

The present invention relates to a method and apparatus for the acquisition of repetitive signals in a sensing device comprising a transmitter to emit a repetitive electromagnetic signal into a transmission channel, an object that interacts with said signal producing a return signal via a reception channel, and a receiver that detects and converts the return signal onto a digital representation through the processing of edge transitions from at least one threshold crossing detector. In particular this disclosure describes a method and apparatus for the digitization of low-level repetitive electronic signals commonly encountered in time-of-flight distance measurement devices.

A variety of sensing applications require the detection and averaging of electronic signals returning from an object radiated with an electromagnetic field. Extracted information from the return signal may reflect physical characteristics of the object such as reflectivity, fluorescence, frequency or time-delay dispersion. Relational information such as distance can be obtained by measurement of the time-of-flight between transmission and signal reception. Through the processing of multiple signal reception channels object orientation in azimuth and elevation can also be derived. A repetitive transmitted signal is commonly used to allow signal averaging providing processing gain to improve receiver sensitivity or to allow the use of analog sample-and-hold techniques to economically sample a high frequency signal prior to lower speed analog-to-digital conversion. The digitization of the return signal offers a high-degree of flexibility in post processing. Processing approaches such as signal averaging, correlation, convolution and frequency transforms are often used to extract useful information from the digitized return signal and are easily implemented using common DSP methodologies.

Excessive cost, power consumption, or complex interface requirements are often issues prohibiting the use of monolithic analog-to-digital converters in high-frequency sensor applications. At digitization rates in excess of 100 mega samples per second, A-D converters typically cost several dollars and as digitization rates approach a GHz, costs increase sufficiently to be unsuitable for many applications. Power consumption, often in excess of one watt, can be a significant limitation for battery-powered devices. Finally the interfacing of digital processing circuitry to a high-speed A-D converter dictates the use of large numbers of parallel I/O channels creating the potential for system noise issues and increased hardware complexity.

For high-speed repetitive sampling, various analog sample-and-hold methods are practiced. At signal bandwidths of a GHz or more, diode samplers are often applied to synchronously sample the analog signal voltage. Effective signal capture times as low as 10's of pico-seconds make this method practical for direct signal digitization into the gigahertz. Historically this approach has been used in high-speed sampling oscilloscopes to digitize a waveform by scanning a narrow signal acquisition window over a larger time period. At each time point one or more analog samples are taken and subsequently the analog value is digitized using a lower-speed analog-to-digital converter. A class of low cost samplers exemplified by U.S. Pat. No. 5,757,320 McEwen has been applied to impulse radar based distance measurement along with a variety of specialized applications.

A limitation of repetitive sampling using sample-and-hold technology is low processing efficiency. Processing gain relates to the ability of post processing to improve signal-to-noise ratio through signal averaging. For incoherent signal integration, the signal-to-noise ratio theoretically improves following a square root relationship with the number analog values averaged. For pin diode or FET based samplers, the sampling window covers a very short time interval, but often requires 10's of nanoseconds before it is ready for the next sample. A signal-sampling time window comparable in duration to the recovery time of sampler dictates that only a single sample may be taken during the window resulting in a low effective signal acquisition duty cycle.

Fast analog shift registers can approach the speed capability of pin-diode based sample-and holds with the added benefit of allowing sequential samples within an acquisition window. U.S. Pat. No. 6,509,958 by Pierenkemper teaches a method for high accuracy distance measurement by sampling a return signal using a high-speed analog shift register. The CCD based shift register performs a rate conversion by rapidly shifting the analog values into the register and subsequently feeding the data out at a lower rate to an economical analog-to-digital converter. Since time-of-flight rangefinders typically use transmitters with low duty cycle, time is often available between pulses to process the signal samples acquired during the reception time window.

In U.S. Pat. No. 6,950,177 inventor Robert Lewis et al. teaches a method to achieve high measurement accuracy using a low-cost signal digitization approach using on a single-bit comparator with an adjustable threshold reference. The sampling and processing is suitable for implementation in high performance FPGA's (field-programmable-gate-arrays) allowing a high level of hardware integration at low system cost. The disclosed method is based on the storage of a succession of histograms representing the cumulative statistics of the one/zero logical state of the comparator output. After the accumulation of data at a threshold level, the histogram data is combined with previous data. Following each series of acquisitions, the threshold level was increased and the histogram acquisition and accumulation process repeats until the threshold was swept through the entire waveform in a stepwise fashion. The method weights the most accurate data at each comparison level allowing the generation of a composite waveform with good signal fidelity. Since the incoming bit rate is significantly faster then the base clock rate of the system, a period after each signal acquisition window significant time is required to perform a bit summation and signal reconstruction process.

To compensate for amplitude dependent delay dispersion in a receiver, a transmit reference signal can be injected into the receiver channel with an amplitude matched to the return signal. The matching of the signal return and reference in a single common receiver channel, dictates that non-linear distortion inherent in the receive channel impact both the reference and receive signals in a similar fashion. Since both signals are matched, amplitude dependent distortion in the received signal matches the distortion in the reference such that no net distance measurement error is produced.

A limitation in the analog-to-digital conversion process of both Pierenkemper and Lewis et al. is the requirement for a downtime to process an acquired block of data. In Pierenkemper the downtime is required to unload contents of the CCD delay line into a lower rate A-D converter. In Lewis et al. time is required to allow the summation and storage of bit information from the high-speed bit memory. In many applications the transmitter needs to operate continuously for relatively long periods of time. This is often the case when lower power CW Lasers or LED's are applied in phase detection based distance measurement systems with long signal integration times. Integration times a millisecond or longer makes the temporary storage of raw bit data impractical for low cost hardware with limited memory capacity.

In Lewis et al. the use of a single comparator for analog-to-digital conversion is desirable due to it's low cost and complexity, but the need for an adjustable attenuator to match the reference and return signals amplitudes adds undesirable cost and complexity in addition to adding constraints to system performance. The reaction time of an adjustable attenuator places a fundamental limitation in the minimum measurement time of the system. The setting time of an attenuator based on liquid crystal or mechanical shutter, often on the order of 100's of milliseconds, limits the ability of the system to react to rapid signal level changes encountered in optical scanning beam systems.

It is an object of the present invention to further develop a signal digitization approach suitable for low-cost sensor applications that allows continuous signal acquisition, high processing gain and suitability for implementation in field programmable gate arrays.

An added objective of the present invention is to provide an optional means to feed the transmitted signal back into the receiver to provide a reliable reference for the time of transmission. Since the disclosed edge digitization embodiments are linear, a variety of digital processing techniques can be applied to the digitized receive signal to compensate for typical limitations in hardware performance.

SUMMARY OF THE INVENTION

The present invention discloses a method and apparatus for the acquisition of repetitive signals in a sensing device comprising a transmitter, a receiver and an object. The transmitter repetitively emits a modulated electromagnetic signal into a transmission medium, with the emitted signal interacting with the object producing a counter propagating return signal. The return signal may contain properties that reflect all, or a portion, of the initial signal or may be correlated with said signal through a process of absorption and reemission, in which reflected signal characteristics are governed by the object's physical material characteristic. The return signal is detected and converted into digital signals by a receiver via a reception channel. A key improvement in the disclosed invention the use of edge transitions rather than logic levels from one or more comparator outputs to reconstruct the return signal waveform. A waveform acquisition and reconstruction method is disclosed for use with an edge sampling detection apparatus.

The use of edge information offers unique attributes over processing using binary logic states. There is an inherent data compression using edges over logic level due to a lower rate of average signal crossings relative to the logic state transitions. Assuming a sample rate meets the Nyquist criteria for a band-limited signal, data compression increases with oversampling since the number of edge crossing per unit time remains constant while the number of resolution elements increase. The rate of crossings roughly follows the maximum frequency content of the return signal. A signal bandwidth of 200 MHz results in roughly a rising or falling edge every 2.5 nanoseconds. Assuming a 500 psec sample interval, only 1 out of 5 sample points will contain a valid edge.

At high frequencies, the previous estimation of edge crossing rate is higher than seen in practice due to the limited gain and bandwidth of the signal comparator. The required amplification in the signal path prior to the comparator is typically set so that the amplitude distribution of system noise is sufficient to provide limiting at the comparator output. Higher gain, although undesirable, is typically avoided since additional gain must be balanced by reduced bandwidth and dynamic range. Without a large level of front-end system gain, the comparator is often misses short duration, small amplitude positive and negative signal and noise excursions reducing the valid transitions seen at the threshold detector output.

Since propagation delay is defined relative to an edge rather than a logic state, the rising and falling edge cumulative statistics at a sampling point can be used to estimate the effective sampling delay experienced by the signal. Comparator propagation delay dispersion, estimated from the edge sum and difference, can be corrected in the final waveform minimizing a major contributor to large signal distortion.

The use of edge information provides an opportunity to extract signal slope and ultimately a reconstructed waveform through integration. The processing of edges differentiates the incoming signal and noise. Differentiation transforms the gaussian statistics of the noise amplitude into a gaussian distribution for the rate of edge crossing after threshold detection. For a given signal slope, as the threshold level approaches the zero crossing point of the signal, the rate of crossings reach a maximum. When the signal's slope is significantly less than the maximum slope produced by the noise, the total number of signal crossing will be comparable to the noise distribution alone. In this small signal regime, the difference between the average number of rising and falling edges closely reflects the slope of the waveform.

At large signal levels, the signal's slope contribution will exceed the maximum contribution due to noise, resulting in the domination of either rising or falling edges and an saturation of the measured slope estimated by the difference between the numbers of edge crossings. Once the signal's slope contribution dominates over the maximum rate of change due to noise, the number of total crossings at a given sample point will increase until the number of crossing equals the total number of signal waveforms averaged during the signal integration period.

Based on the edge crossing statistics two waveform reconstruction embodiments are disclosed. The first implementation calculates the difference between rising and falling edges to estimate signal slope. Under strong signal conditions, this approach adds the feature of sweeping of the threshold detection level through the extent of the signal to prevent large signal distortion and clipping. As the slicing threshold level moves close to signal at a given sampling point, random noise produces a difference of rising and falling edge transitions proportional to the slope of the signal in that region. As the threshold matches the signal level at the sampling point, the rate of crossings disproportionably increases, effective weighting of edge data providing optimal signal to noise ratio. The estimated slope is integrated to recover the signal waveform, however DC and lower frequency content in the signal is lost.

A second edge processing implementation is disclosed preserving low frequency and DC information by processing the change in the total number of edges at successive threshold levels. The threshold slicing level is swept through receive signal as in previous embodiment while gathering the sum of rising and falling edges. Since the rate of rising and falling edge crossings follow a Gaussian distribution, with a peak at the point the threshold crossing the signal, the crossing point can be estimated by interpolating crossing rates around the crossing point. Both methods offer high processing gain, continuous signal acquisition and can be implemented in a low cost FPGA.

One embodiment transmits a repetitive signal that is synchronously detected using edge processing based digitization. A tapped delay line with multiple output latches, capture multiple samples within a given clock cycle. Successive pairs of samples are converted into rising or falling edge determinations that are accumulated for each time slot within the signal acquisition period. At the completion of the signal integration period, a processor converts the stored edge information into waveforms based on normalized edge difference waveform reconstruction method.

An alternate embodiment sweeps the threshold level on the comparator reference based on the detected signal strength of the return waveform. During the initial transient decay of a received signal burst, the number of time intervals the input signal is above threshold is accumulated. Based on the accumulated count value the signal strength is estimated. A detection reference level, produced by a digital to analog converter, is sweep through the full extent of the signal envelope to allow the accurate reconstruction.

An implementation of a signal sampler is disclosed using a pair of matched delay lines with associated data latches and logic to compensate for asymmetry in propagation delay often experienced between rising and falling edges of the single bit digital input.

An alternate implementation of the delay line sampler uses an independent oscillator to allow signal transmission and acquisition at a slightly different frequency from the system master clock. Often master clock noise present in a system is sufficiently large to interfere with signal detection. Transmission and reception at a slightly different frequency from the master clock prevents this added noise from being integrated synchronously with the return signal. Implementation of the transmit and receive frequency reference within the processing IC minimizes the likelihood of leakage into the receiver signal chain.

An alternate embodiment of an edge summation process reduces the number of adders necessary to accumulate the edge sums while also reducing the required word size of the edge count memories. Additions of rising and falling edges are alternated through the use of a pipeline memory to carry edge data to the next acquisition cycle.

An alternate embodiment signal sampler uses an external data synchronizer between the signal detection comparator and the edge sampler. Improvement in sampling performance is achieved by the placement of a data synchronizer prior to the edge sampling using a delay line based sampling network. The sampling of the comparator output with a clock reference at the desired system sample rate eliminates the effect of jitter caused by downstream non-uniform delays in the signal sampler.

A optical feedback embodiment is disclosed which uses a moving optical waveguide to alternatively provide variable intensity transmit reference, high transmission receive path access and blocking of both the receiver and transmit feedback signals. The actuation of the waveguide functions can be combined with a pushbutton or sliding switch functionality used to initiate a measurement in handheld applications or it can be implemented using a linear or rotational electromagnetic actuator for stand-alone operation.

Three functions are desirable when implementing an optical feedback means for time-of-flight distance measurement. First, it is desirable to provide a means to periodically block the receiver optical path to obtain a measurement of background interference typically encountered when the transmitter modulates a laser diode or light emitting diode source. Obtaining a measurement of the interference without the signal offers the opportunity to subtract the interference in post processing. Second, with the receiver path still blocked, it is desirable to adjust the intensity of the transmit feedback so that it matches the strength of the receive signal. This allows the cancellation of propagation delay uncertainties due to signal dependent variations propagation delay in the receiver. Finally, the optical element should allow the received signal to pass with negligible attenuation and without unintended leakage of the transmitter reference.

Aspects of the present invention can be accomplished using hardware, software, or a combination of both hardware and software. The software for the present invention is stored on one or more processor reliable storage media such as in RAM, ROM or hard disk drives. In alternative embodiments, some or all of the software can be replaced by dedicated hardware including custom integrated circuits, gate arrays, FPGAs, PLDs, and special purpose computers.

DETAILED DESCRIPTION

Figure 1:
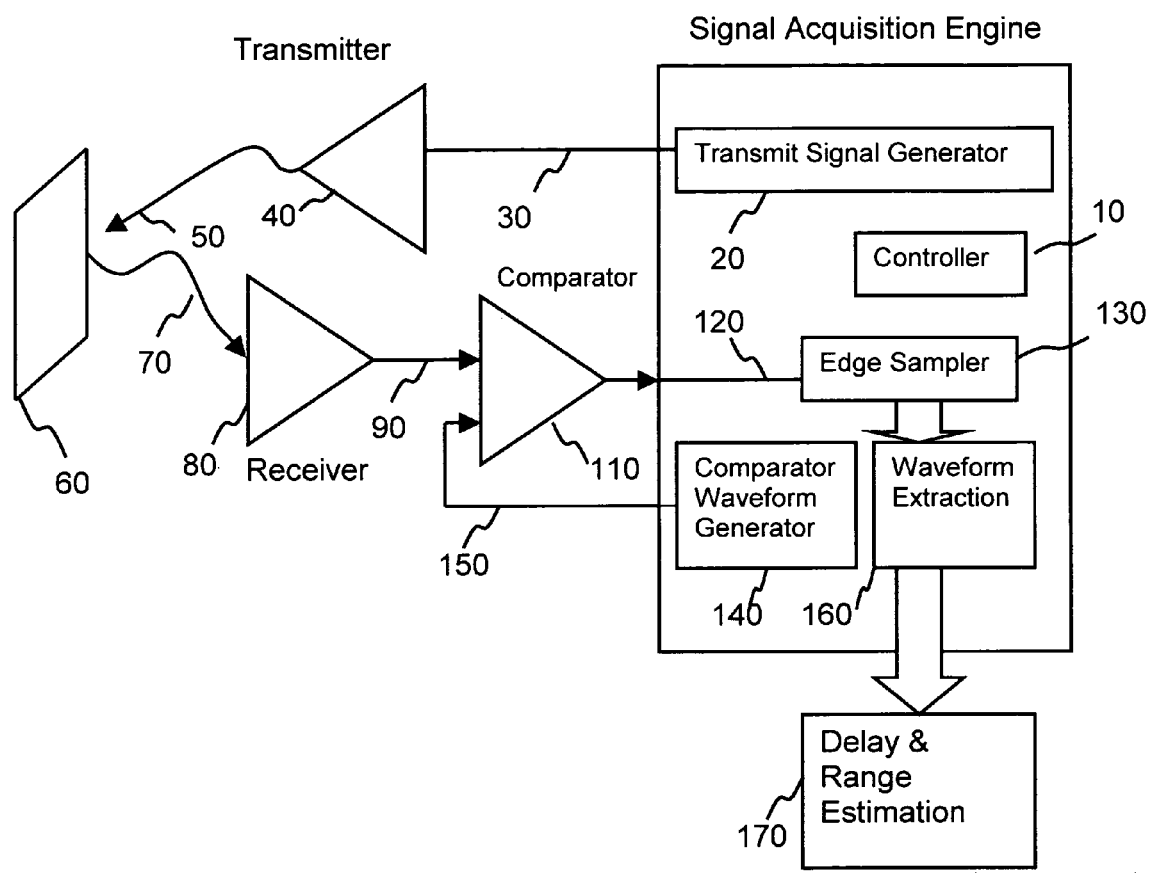
FIG. 1 shows a generic block diagram of the sensing device.

FIG. 1 shows a block diagram of a generic embodiment of the sensing device. Initiated by a command received from the Controller 10, transmit signal generator 20 produces a repetitive transmit signal 30 directing the modulation of transmitter 40. The transmitter produces a modulated electromagnetic signal that propagates into a transmission channel 50. The transmit channel may consist of a region in space containing a narrow propagating optical beam or follow a relatively broad RF beam pattern. The signal energy interacting with object 60 produces a counter propagating return signal 70. The reflected return signal may contain attributes of all, or a portion, of the initial signal or may be correlated with the transmit signal through a process of absorption and reemission. Receiver 80 detects a portion of the returning electromagnetic signal converting it into received electrical signal 90. Comparator 110 converts the signal into a single-bit digital signal 120. Sampler 130 samples and stores a history of rising and falling edge transitions due to multiple acquisitions synchronized with the repetitively transmitted signal. Comparator waveform generator 140 varies the threshold level 150 based on incoming signal strength, DC offset, and the selected waveform extraction method. Upon the completion of the acquisition process, edge histories processed by the waveform extraction block 160, produce a digital representation of the incoming signal waveform. Post processing block 170 is used to extract desired parameters from the return waveform such as time delay for distance estimation or the rate of signal decay to measure fluorescence decay.

Figure 2:
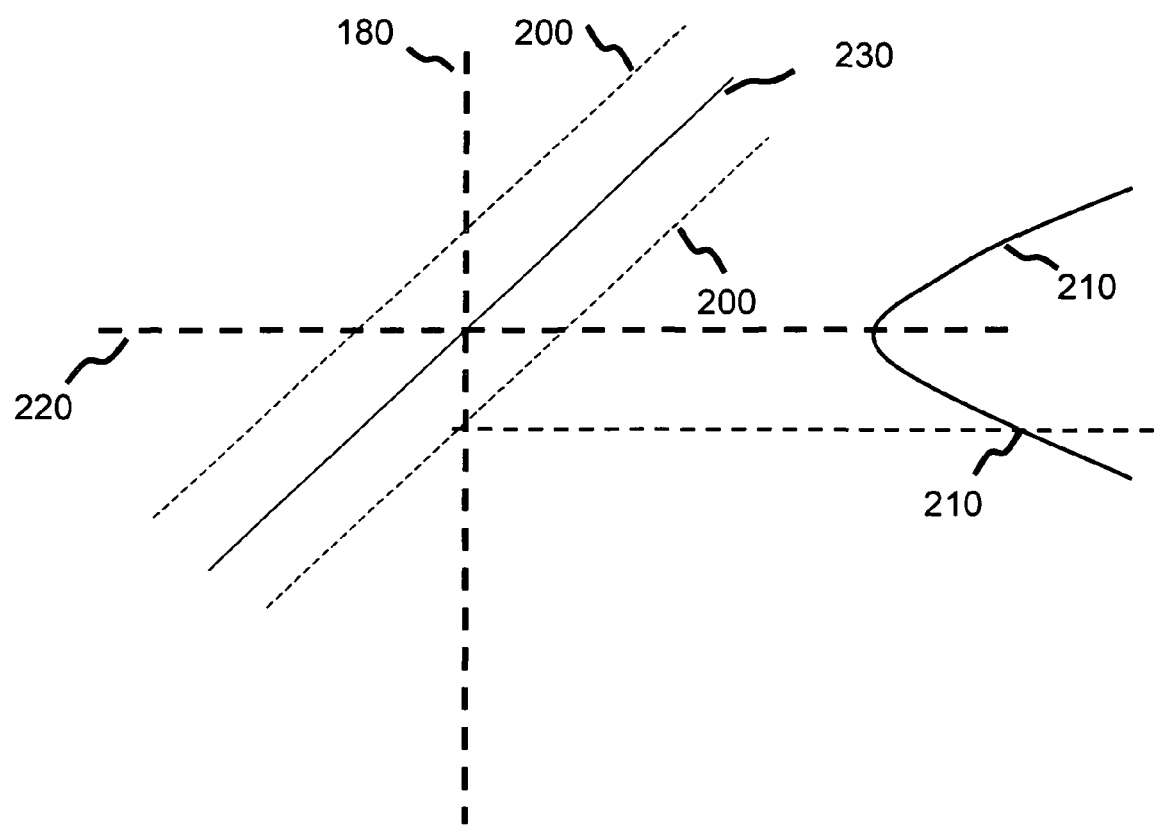
FIG. 2 shows the noise and signal envelope for an arbitrary signal segment with associated gaussian noise distribution.

FIG. 2 shows the noise and signal envelope for a repetitive signal with a normal noise distribution. Repetitive signal 230 is synchronous with a sampling point represented by dotted vertical line 180. Noise envelope 200 represents the excursion of the signal and noise accumulated over time. The median crossing point for the signal, marked by horizontal dotted line 220, also denotes the peak in the noise density function 210 typically following a normal or gaussian statistical distribution. Horizontal line 210 represents an offset from the mean signal crossing point of one standard deviation or commonly referred to as a one-sigma deviation. The cumulative probability that the signal will cross between the one-sigma deviation points represented by the noise envelope is 68% of the time. Movement off the center of the distribution results in a lower probability of signal presence. Ultimately, the probability of the signal presence more than 3-sigma of the center of the distribution approaches zero.

Figure 3:
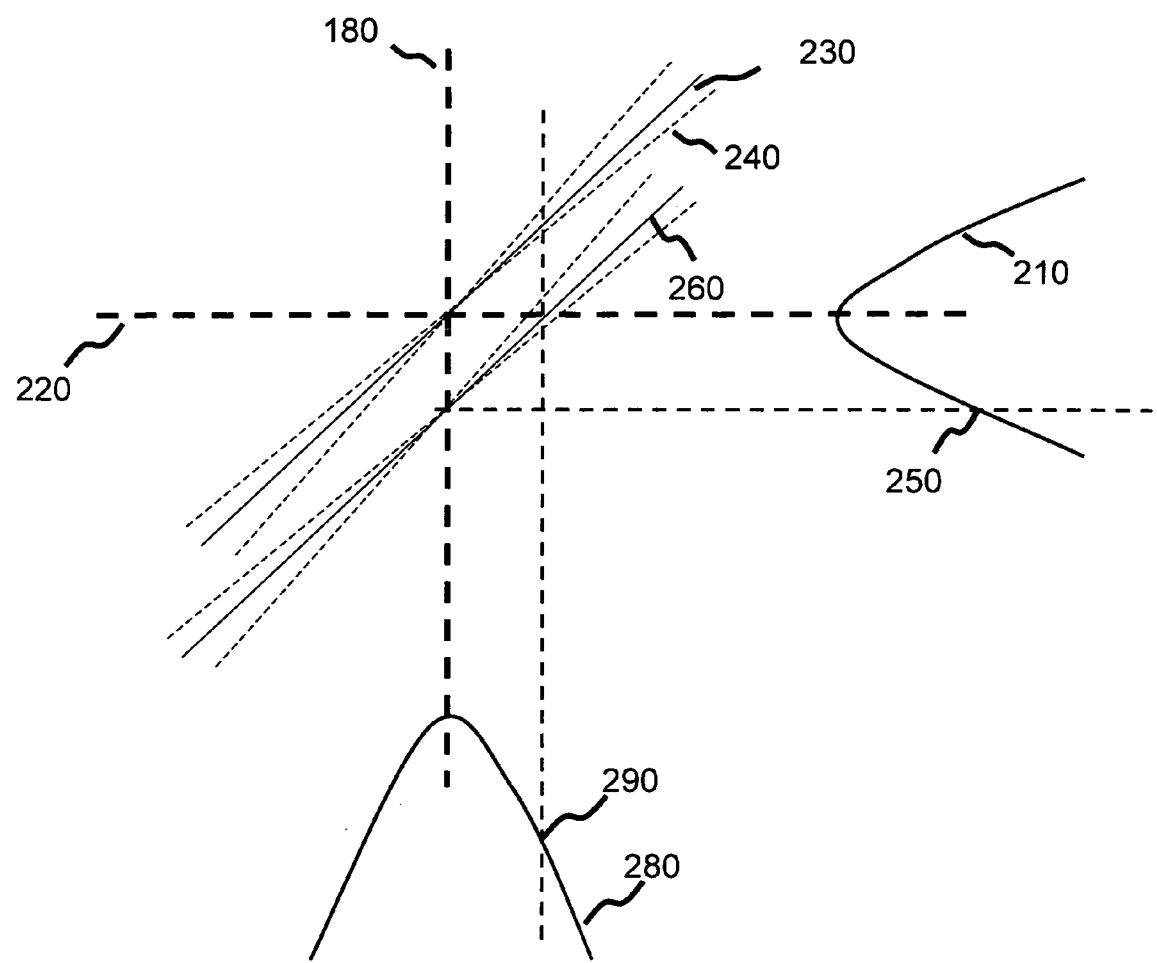
FIG. 3 shows the interaction of the system noise and signal on edge crossings.

FIG. 3 shows the interaction of the system noise and signal on the signal envelope. Boundary lines above and below the signal segment 230, are designated as 240, represent the modulation of the instantaneous slope of the signal by the contribution of high frequency components of superimposed noise. This averaged slope variation follows the mean signal location and contributes to broadening in the signal edge crossing distribution 280. The vertical amplitude displacement of the signal crossing indicated by signal segment 260 results from lower frequency components within the noise distribution at point 250 and translates the crossing point of signal relate to a portion of the edge crossing distribution at 290.

Figure 4:
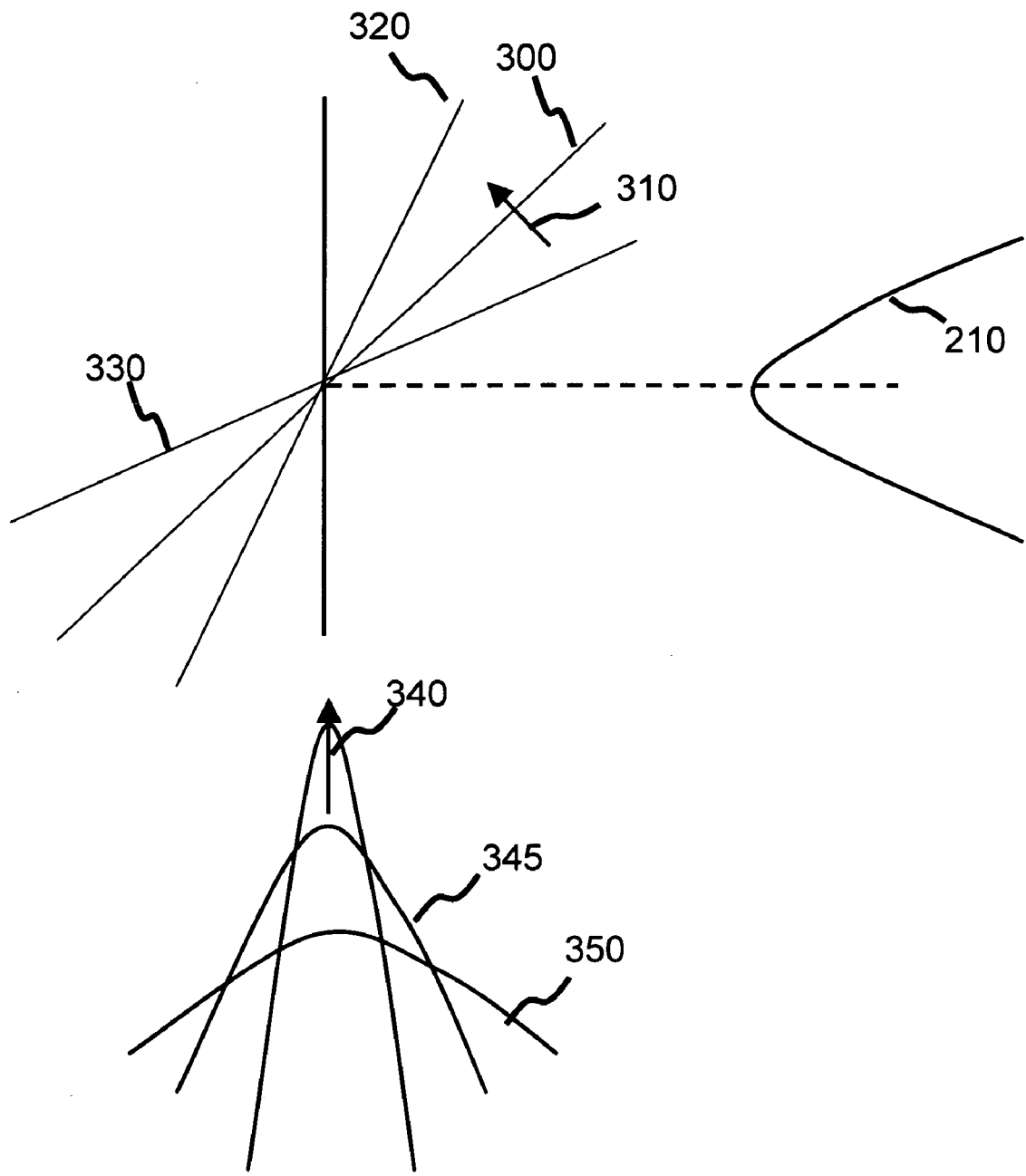
FIG. 4 shows the effect of increasing signal slope on the edge crossing statistics.

FIG. 4 shows the effect of increasing signal slope on the edge crossing statistics. System noise distribution 210 is mapped by the signal's slope 300 into crossing distribution 345. The steepest signal slope 320 maps to the most peaked edge crossing distribution 340. A lower signal slope 310 maps to the broadest distribution 350. In the absence of noise, the total number of signal crossings equals the number of signal acquisitions. As the noise is added, the peak number of rising or falling edge crossing are reduced along with the detected crossings at any arbitrary point in the crossing distribution.

When the signal slope is low, the number of crossings in a given sample interval will reflect the average number of crossings due to noise.

Figure 5A:
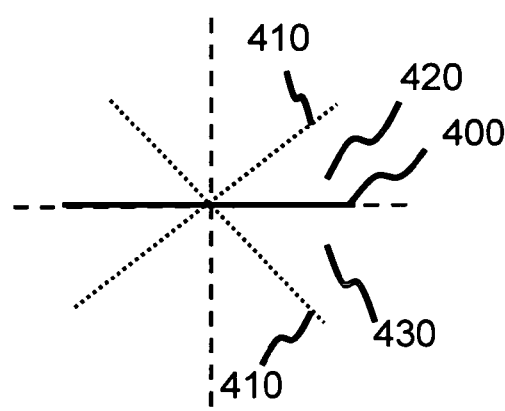
FIG. 5a shows a signal segment with no slope with added noise modulation.
Figure 5B:
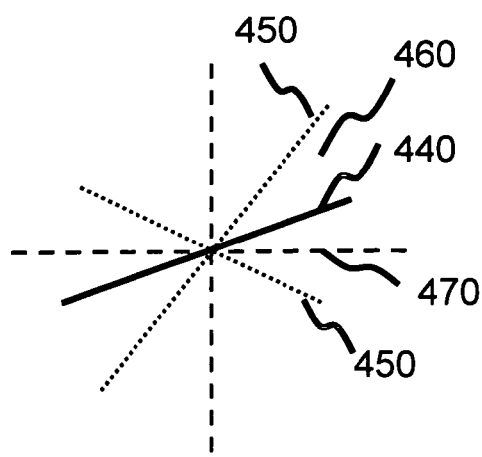
FIG. 5b shows a signal segment with positive slope with added noise modulation.
Figure 5C:
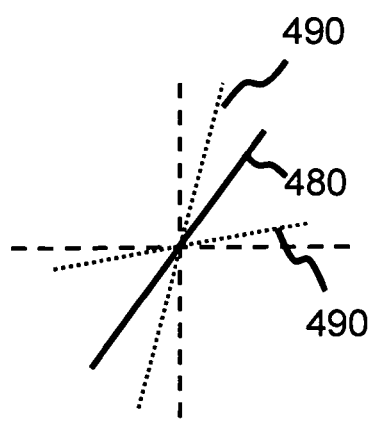
FIG. 5c shows a signal segment with large positive slope.

FIGS. 5a-c illustrate the effect of system noise on signals of increasing slopes. In FIG. 5a, a signal segment 400 is shown with zero average slope and the associated range of slope variation bounded by dotted line boundary 410. High frequency components of the noise distribution add or subtract slope from the original signal. Signal boundary contained in upper region 420 represents positive crossings while those in lower region 430 represent negative crossing. If normalized to the total number of edges, the difference between the positive and negative transitions bounded by regions 420 and 430 represent the average slope of the waveform. In this first case, the difference is zero indicating no slope. In FIG. 5b shows a signal segment 440 with positive slope along with slope boundaries 450. Region 460 represents the region of positive slope while region 470 represent negative transitions. The difference in this case would indicate a positive slope. FIG. 5c shows signal segment 480 with a large positive slope. Slope boundaries 490 are contained in the upper quadrant indicating a condition of positive slope saturation. Further increases in signal slope will yield negligible change in this difference in the slopes.

Figures 6A, 6B:
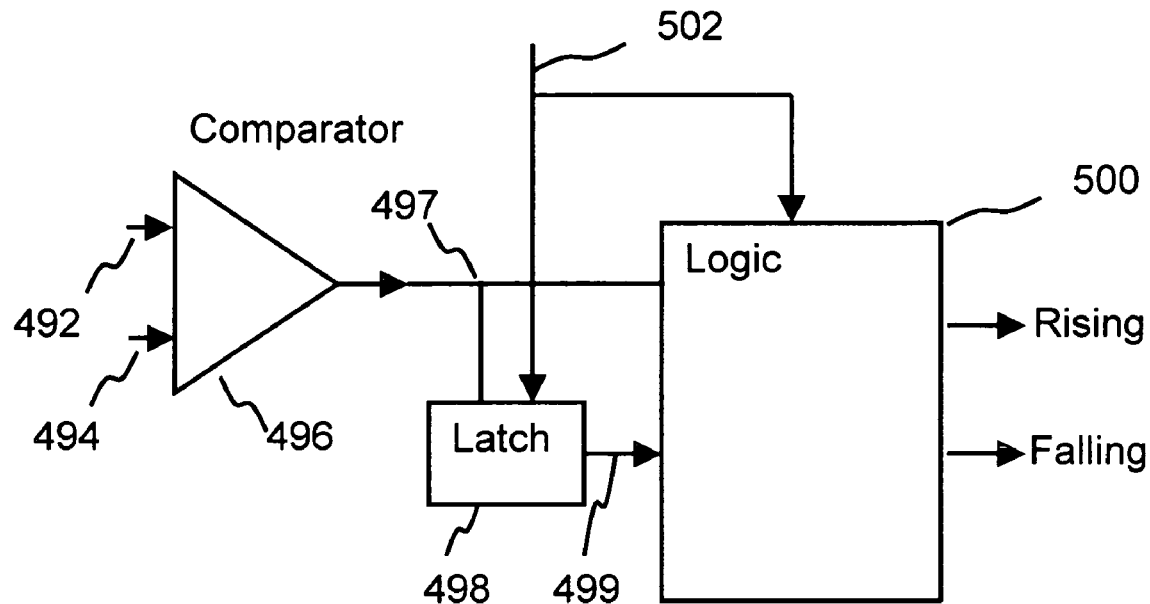
FIG. 6a shows an example implementation of the slope sampler
FIG. 6b describes edge detection logic used to make rising and falling edge determination.

The implementation of edge detection is based on the difference in logic states between sequential samples of the output of a signal-crossing detector. FIG. 6a shows an example implementation of the edge sampler based on the logical comparison of adjacent signal crossing states. Signal 492 is compared against reference level 494 using comparator 496. D latch 498 stores the comparator logic state on the falling edge of the clock 502. Logic element 500 produces rising and falling determinations based on delayed and undelayed comparator states 499 and 497 respectively. Logic table shown in FIG. 6b describes edge detection logic used to make rising and falling edge determination.

Figure 7A:
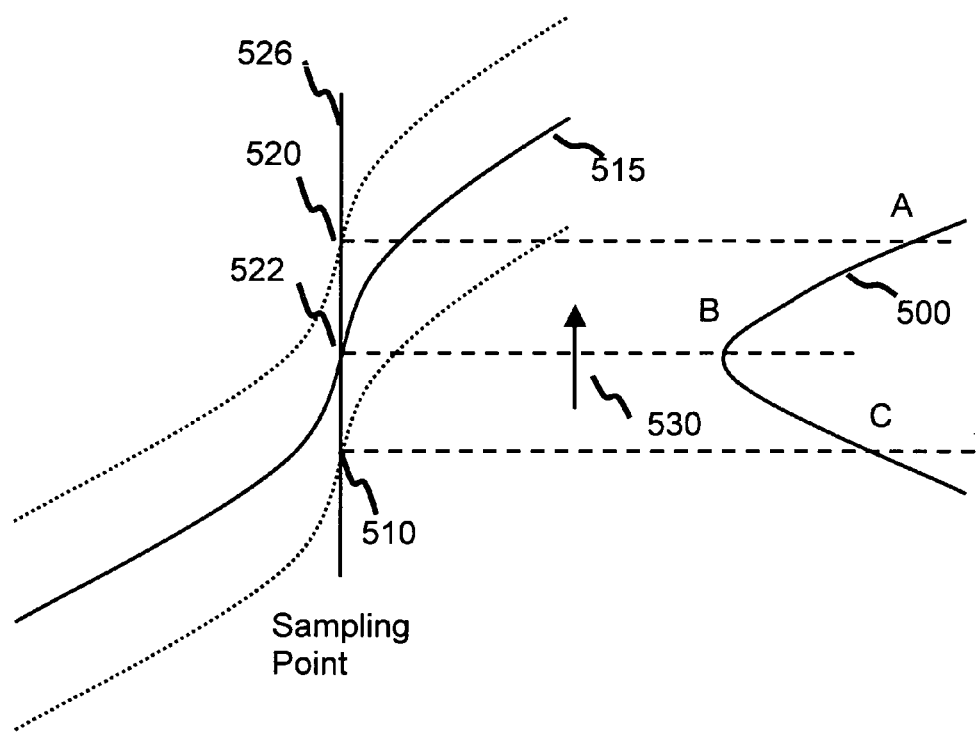
FIG. 7a shows the rate of edge crossings as the threshold level moves through the DC level of the signal.
Figure 7B:
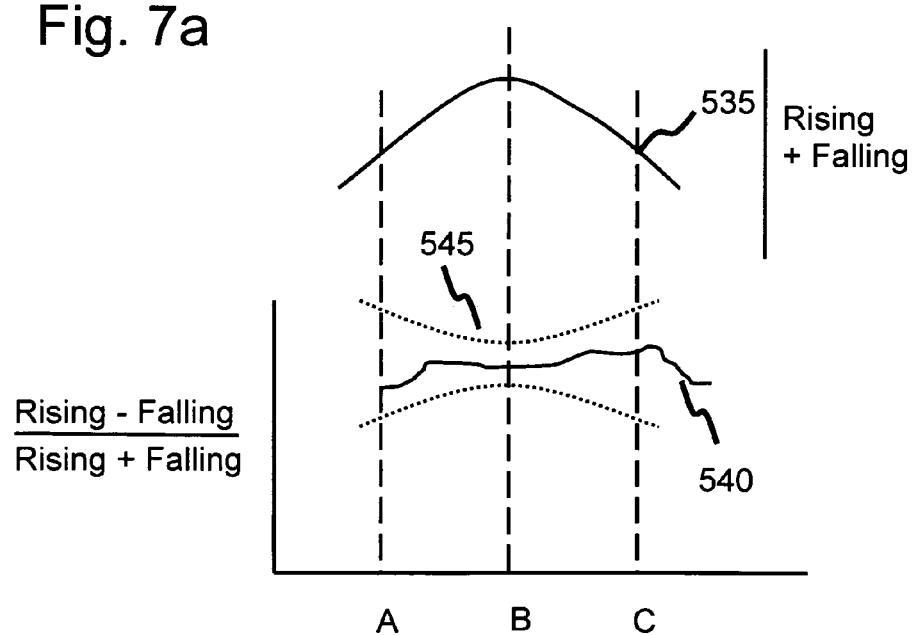
FIG. 7b shows the rate of rising and falling edges relative to a transfer function representing the edge difference divided by the edge sum.

FIGS. 7a and 7b illustrate the edge difference method used to estimate signal slope. In FIG. 7a, dotted lines 510 and 520 represent the range of crossings of signal segment 515 at an arbitrary sampling time 526. As detection threshold, shown as horizontal line 530, moves through the signal envelope the number of crossings vary. Moving from lower boundary 510, the rate of crossings increase until the rate of edge crossings peak at the average signal location marked as point 522. The rate of crossings then drops off as the threshold continues to move towards boundary 520. In FIG. 7b the rate of rising and falling edges are shown relative to a transfer function representing the edge difference divided by the edge sum. Edge rate distribution 535 is the sum of rising and falling edges and relates to distribution 500 of FIG. 7a through Labels A, B and C. Transfer function 540 generally remains constant reflecting the slope as the signal passes through the sample point. The region bounded by dotted lines 545 represents the uncertainty in the slope estimate. As the signal offset moves from Label B to C the uncertainty increases due to the decreasing rate of edge transitions. As the signal moves through the sample point, the crossing rate at Label B will dominate over data taken at points farther away from the threshold. This self-weighting behavior ensures that edge data taken as the signal crosses the threshold dominates, eliminating the need to carry computational overhead to include weighting averaging at discrete threshold steps.

Figure 8:
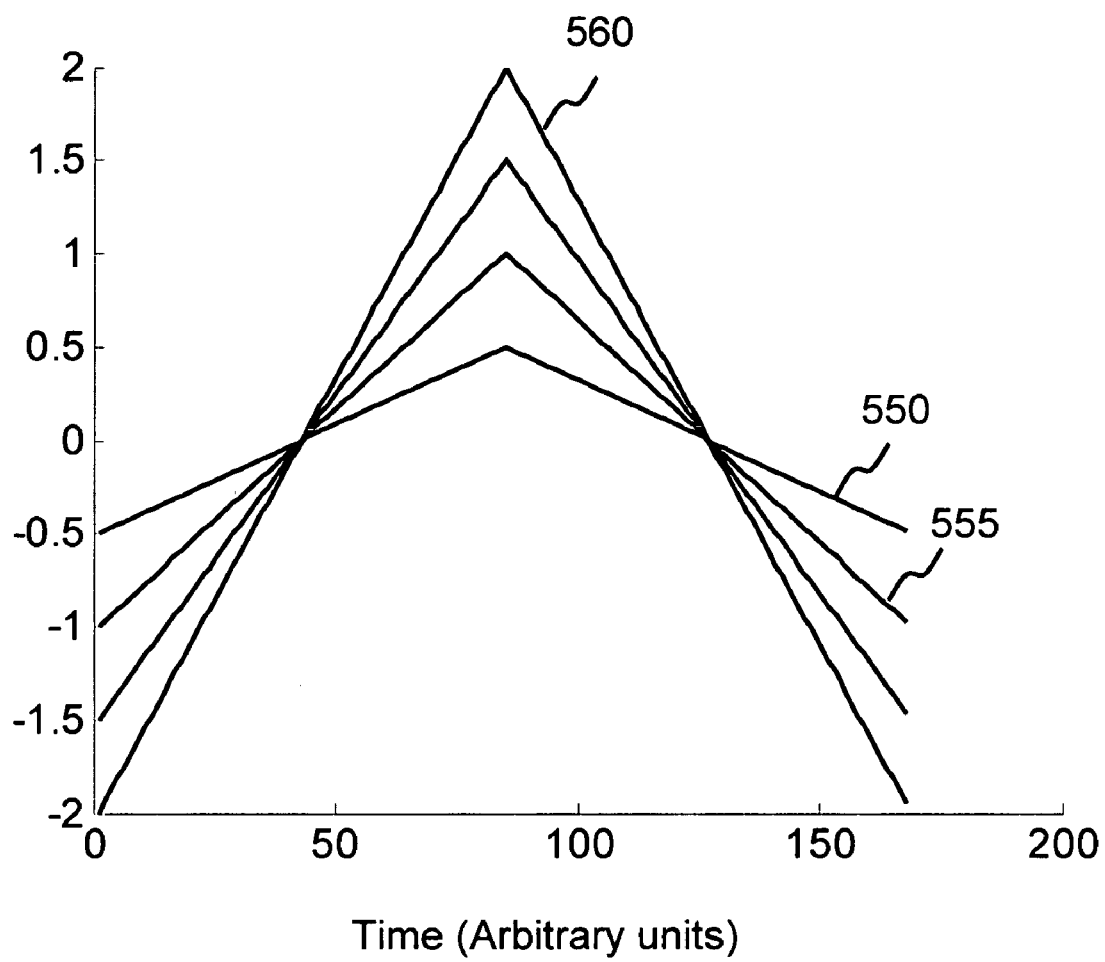
FIG. 8 shows ramp waveform used to demonstrate the edge difference method.
Figure 9:
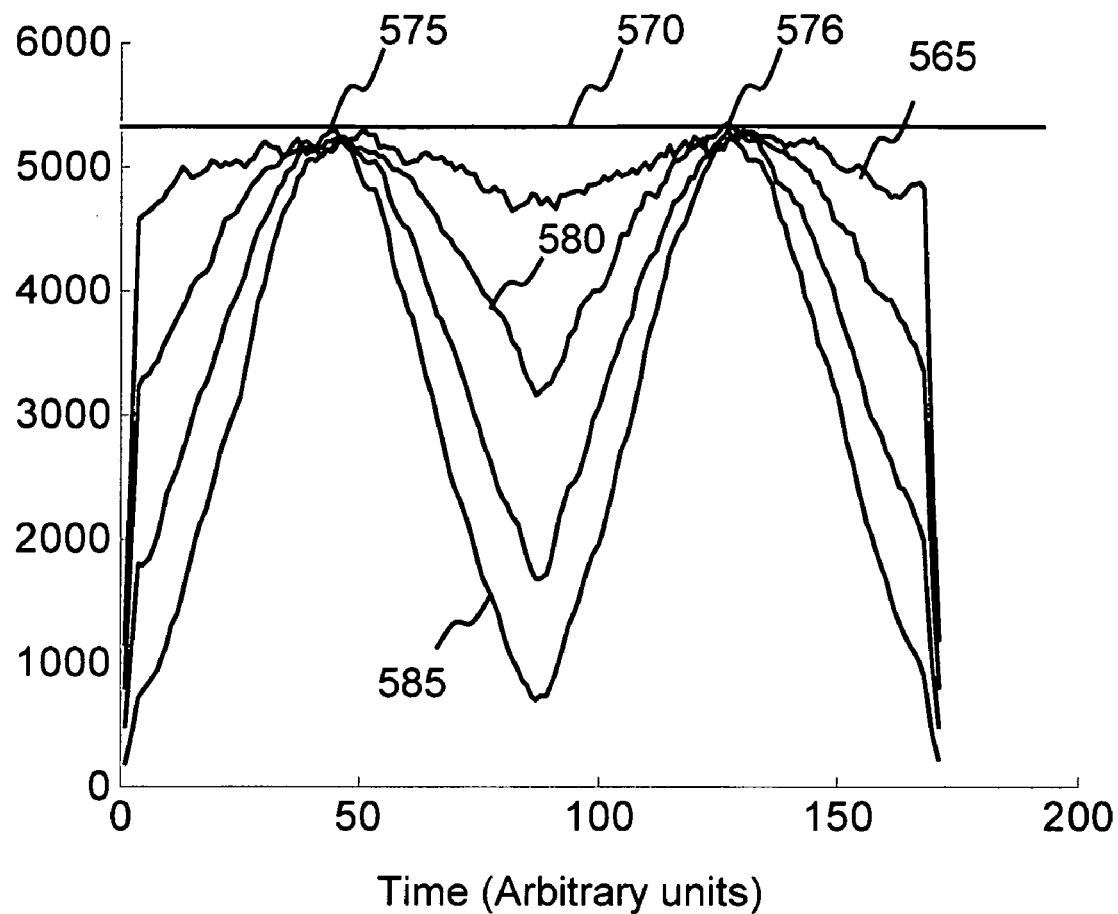
FIG. 9 shows behavior of the sum of positive and negative edges due to ramp input.
Figure 10:
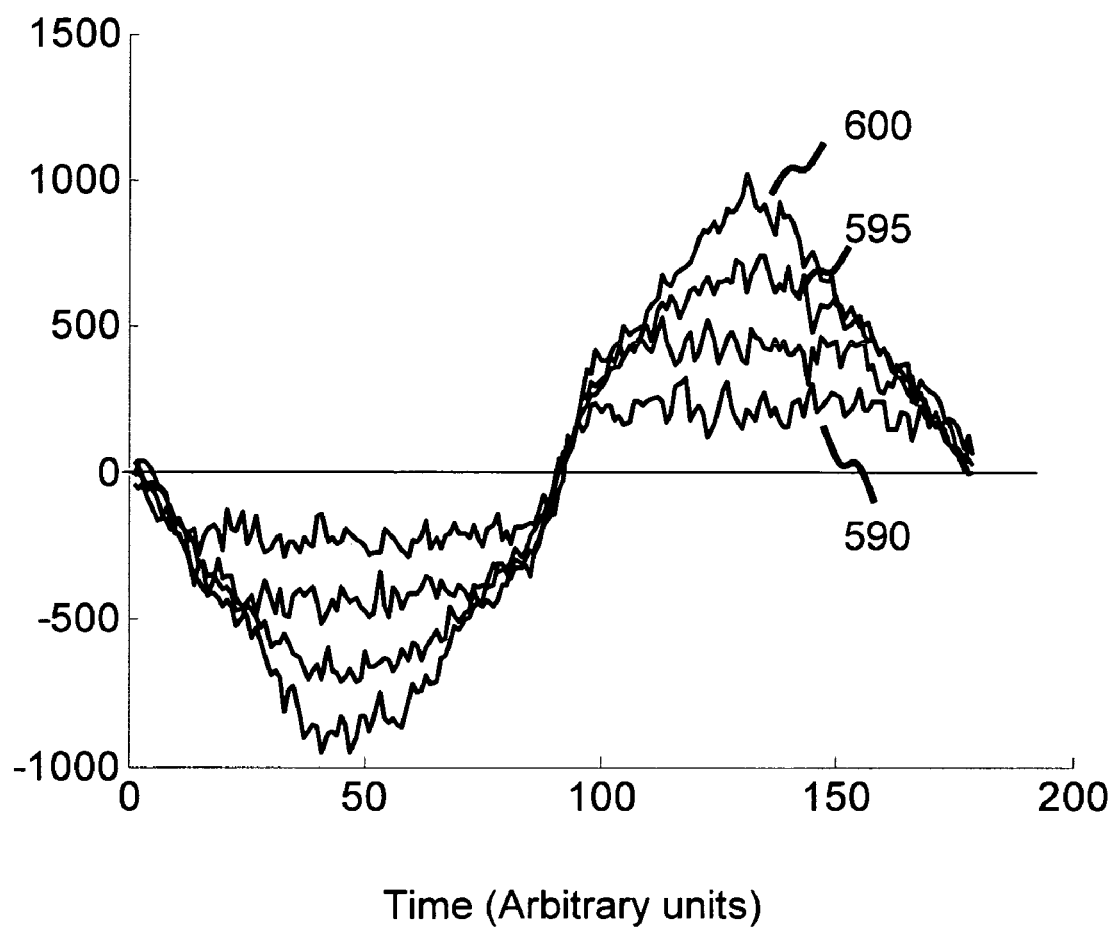
FIG. 10 shows behavior of the difference between positive and negative edge totals due to varying slope ramp waveforms.

FIGS. 8-10 are used to illustrate the process of signal reconstruction based on the edge sum and differences method. In these examples, the crossing threshold remains fixed at zero. This is a simplified case to illustrate the method. In practice, it is desirable to sweep the threshold level when the amplitude of the signal exceeds +/−1.5 standard deviations normalized relative to the RMS value of the noise.

FIG. 8 shows ramp waveform used as a representative signal for this method. Ramps 550, 555 and 560 have progressively increasing peak amplitudes and associated increasing slopes. The vertical-axis of the diagram the represents the signal amplitude waveform normalized to the standard deviation of superimposed noise while the horizontal-axis represents time in arbitrary units.

FIG. 9 illustrates the behavior of the sum of positive and negative edges due to the ramp signals shown in FIG. 8. The edge sum associated with the lowest ramp slope 550 is reflected in edge sum 565. Horizontal line 570 represents the sum of edges due to system noise only. At the zero-crossing point of the waveforms, labeled as pointed 575 and 576, a minimal change in the rate of positive and negative edges is seen. As the signal moves above and below the crossing point, the rate of edge crossings decrease. As the signal rate of change increases, as exemplified by previous waveforms 555 and 560, a progressively lower edge sum rate is seen. Waveforms 580 and 585 are associated with ramp waveforms 555 and 560 respectively.

FIG. 10 shows the behavior of the difference between positive and negative edges as the signal amplitude and slope are increased. As the signal's slope increases, the difference between the rising and falling edge crossing rates change in proportion. Waveform 590 shows the edge difference for the lowest slope signal. It exhibits a relatively constant value with progressively increasing signal offsets. As the signal amplitude increases the difference in the rising and falling edges becomes less reliable as an indicator of signal slope as exemplified by waveforms 595 and 600.

Figure 11:
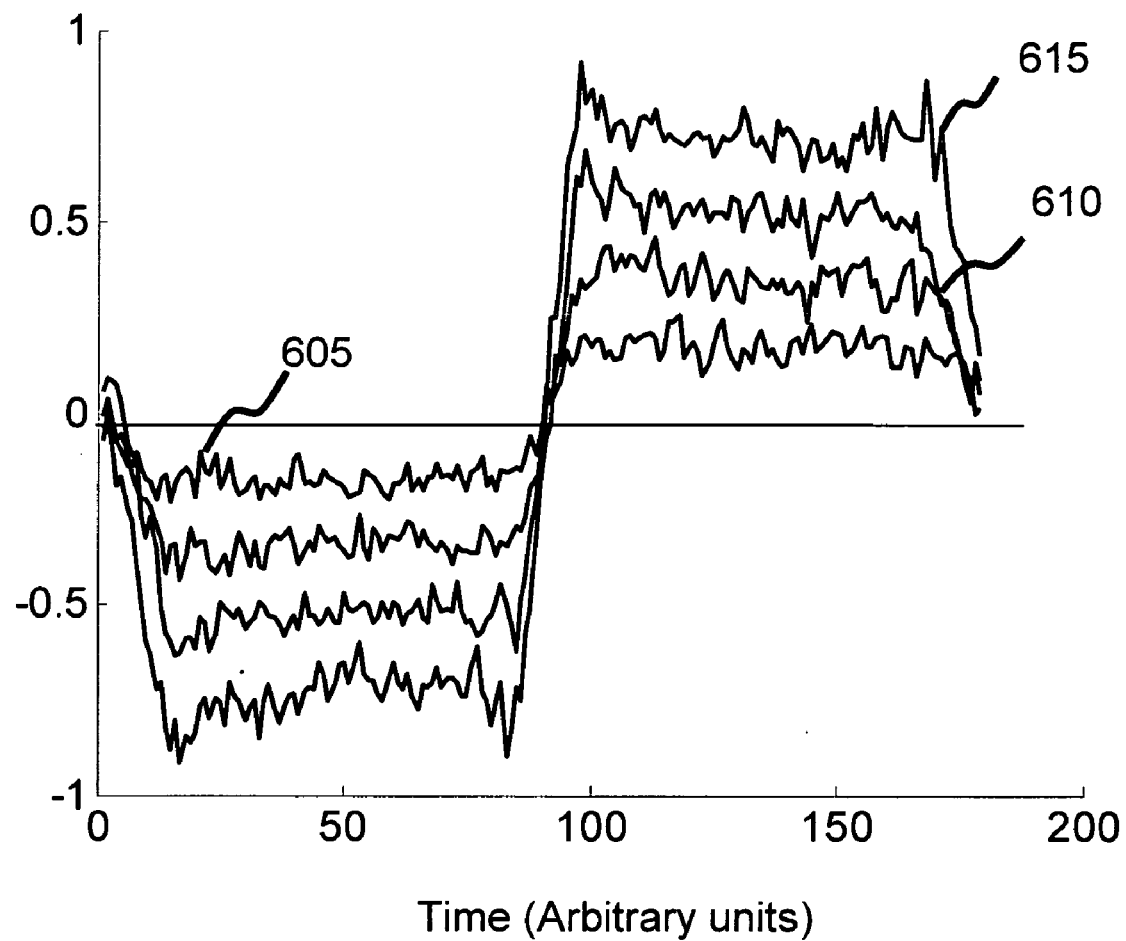
FIG. 11 shows a slope transfer function based on normalization of the difference between positive and negative edges.

The non-linearity of the relationship between the edge difference with increasing signal offsets can be compensated by normalizing the edge difference with the sum of the edges as illustrated in FIG. 11. This plot behavior of slope transfer function based on the difference between positive and negative edges divided by the edge sum. Progressively increasing waveform offsets, as seen in waveforms 605, 610 and 615, represent increasing signal slopes and show reduced dependence of signal offsets.

Figure 12:
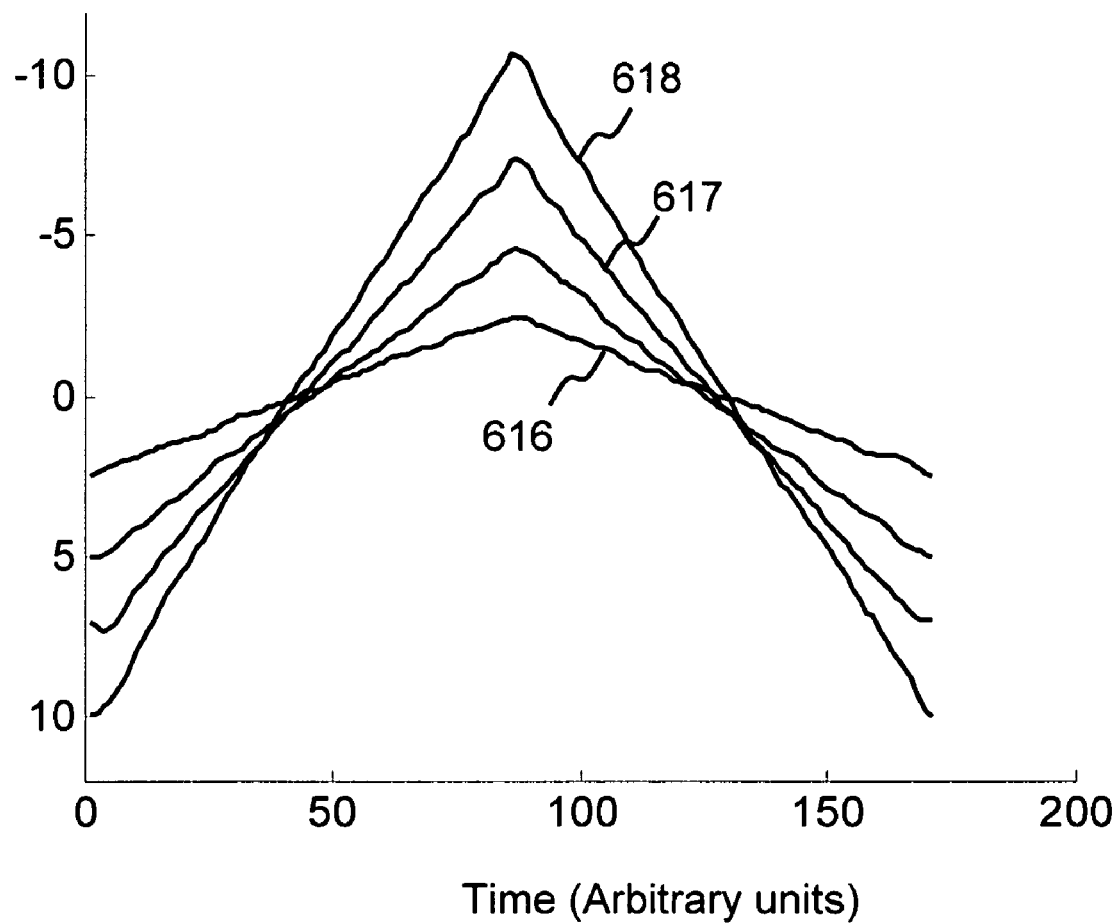
FIG. 12 show a reconstructed ramp waveform based the integral of the normalized sum and difference waveforms.

FIG. 12 shows a reconstructed ramp waveform based the integral of the normalized sum and difference waveforms from FIG. 11. Waveforms 616, 617 and 618 show reconstructed inputs at progressively increased amplitudes. Implementation of the integration function can be through the cumulate sum of the estimated signal slope or through the use of a "leaky integrator" in which the stored integration value decreases over time in the absence of signal inputs. The use of the leaky integration function has been found to decrease the cumulative effect of transient inference on the accuracy of the reconstructed waveform.

Figure 13:
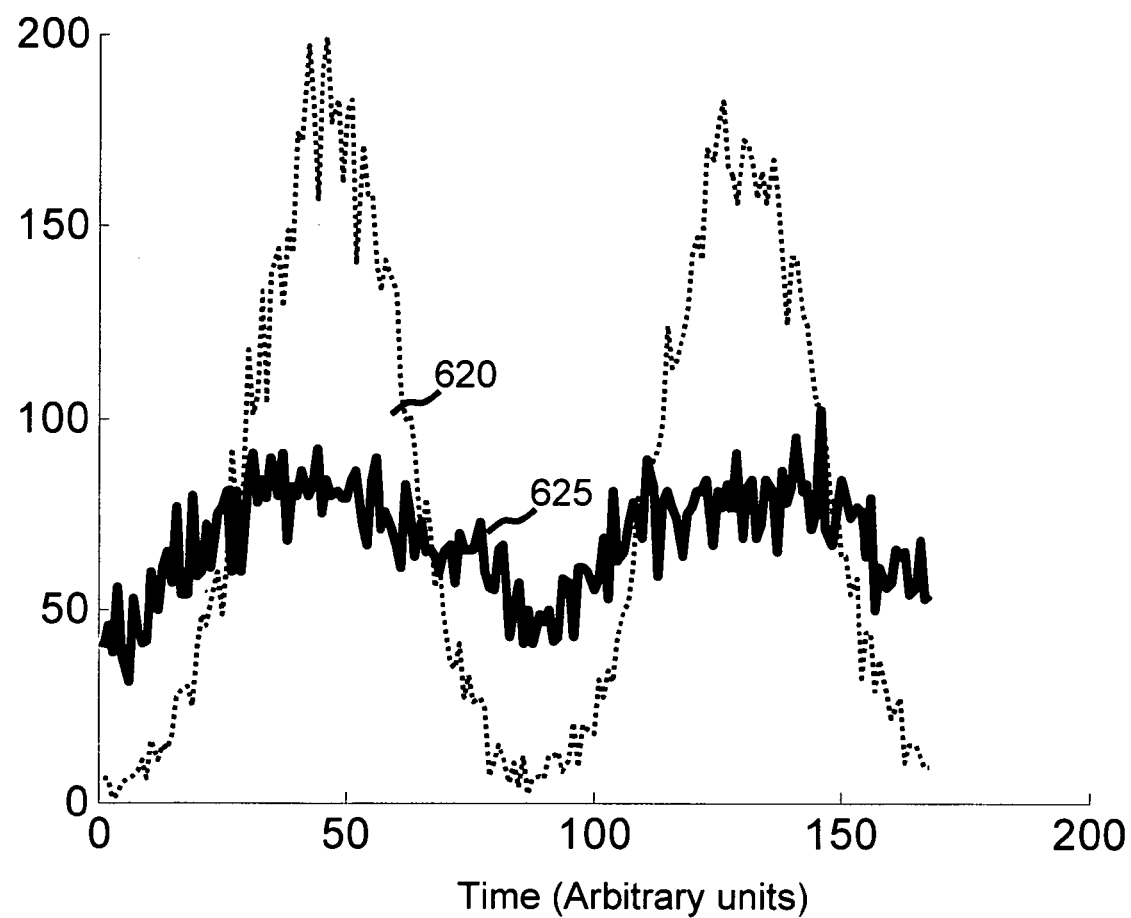
FIG. 13 shows the behavior of edge sum with and without varying the detection threshold
Figure 14:
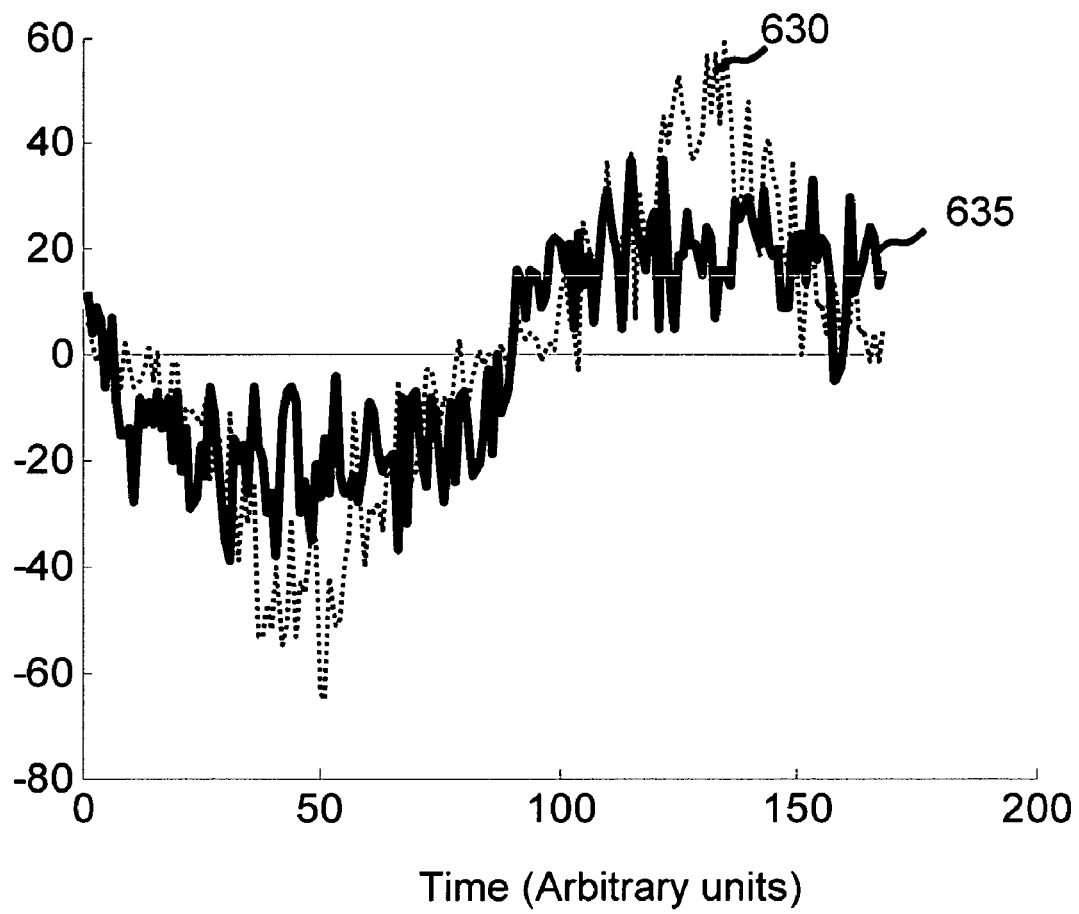
FIG. 14 illustrates the normalized slope transfer function based on the difference between positive and negative edges with and without the threshold movement.
Figure 15:
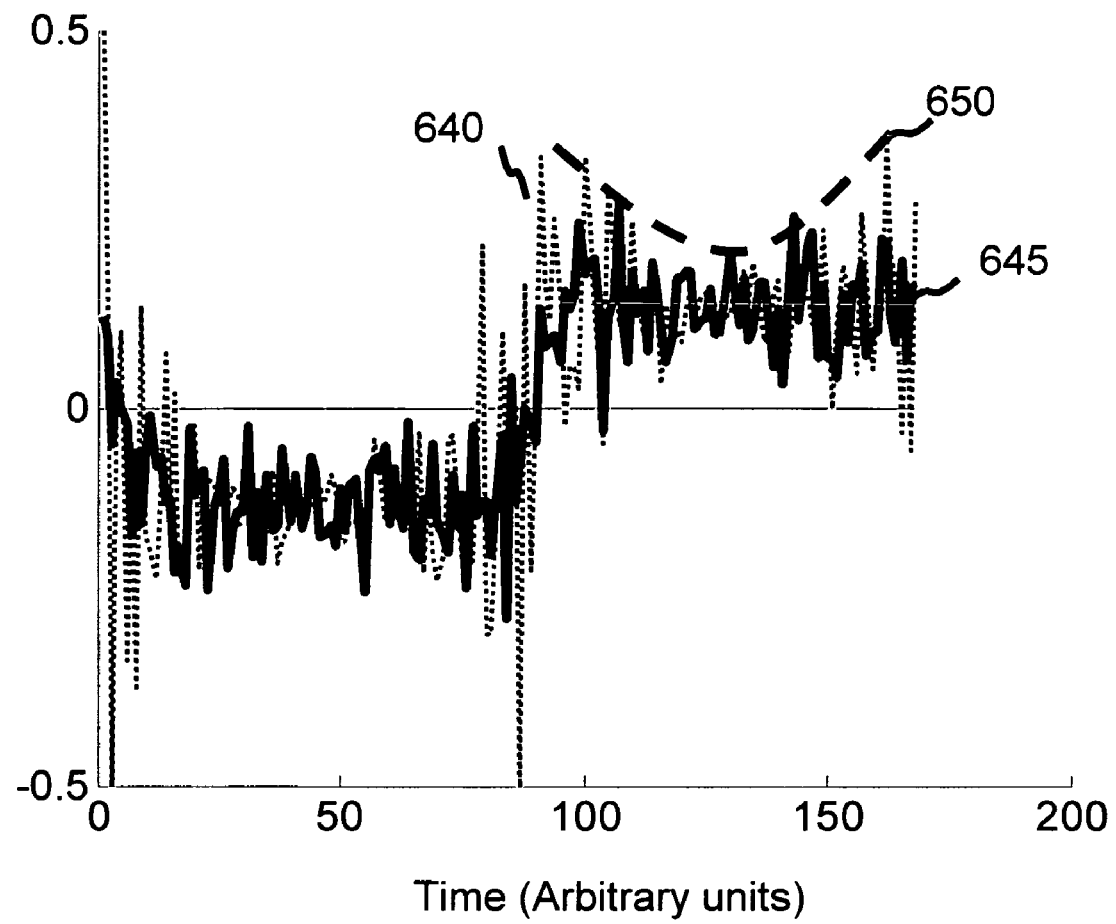
FIG. 15 illustrates the normalized slope transfer function based on the difference between positive and negative edges with and without the threshold movement.

The dynamic range and linearity of the edge difference method for signal slope estimation is improved by continuously sweeping the threshold level through the signal waveform during acquisition. Previously in FIG. 8, ramp waveform 560 with a peak amplitude +/−2 sigma of the background noise was shown. FIGS. 13-15 show the result of simulations using waveform 560 at the major processing steps of sum and difference method with and without variation of the threshold from −(peak signal amplitude)/2 through (peak signal amplitude)/2 during signal acquisition.

FIG. 13 shows the behavior of edge sum with and without varying the detection threshold. Dotted waveform 620 shows a large variation in the edge sum without using the scanning of the threshold level. With the addition of the scanned threshold, the edge sum represented by waveform 625 varies over a much smaller range.

FIG. 14 shows the difference in the rising and falling edges with and without varying the detection threshold. Waveform 635 taken with the threshold sweep shows a constant offset while waveform 630 taken without a threshold shift shows a significant variation.

FIG. 15 shows the resulting transfer function of the edge difference divided by the edge sum for these two cases. Solid line waveform 645, taken with threshold sweep, is more stable near the peak signal offset relative to waveform 640 taken without threshold movement. Dotted line 650 is used to illustrate the increasing envelop of the uncertainty for the fixed threshold case with signal movement away from the threshold level.

Figure 16:
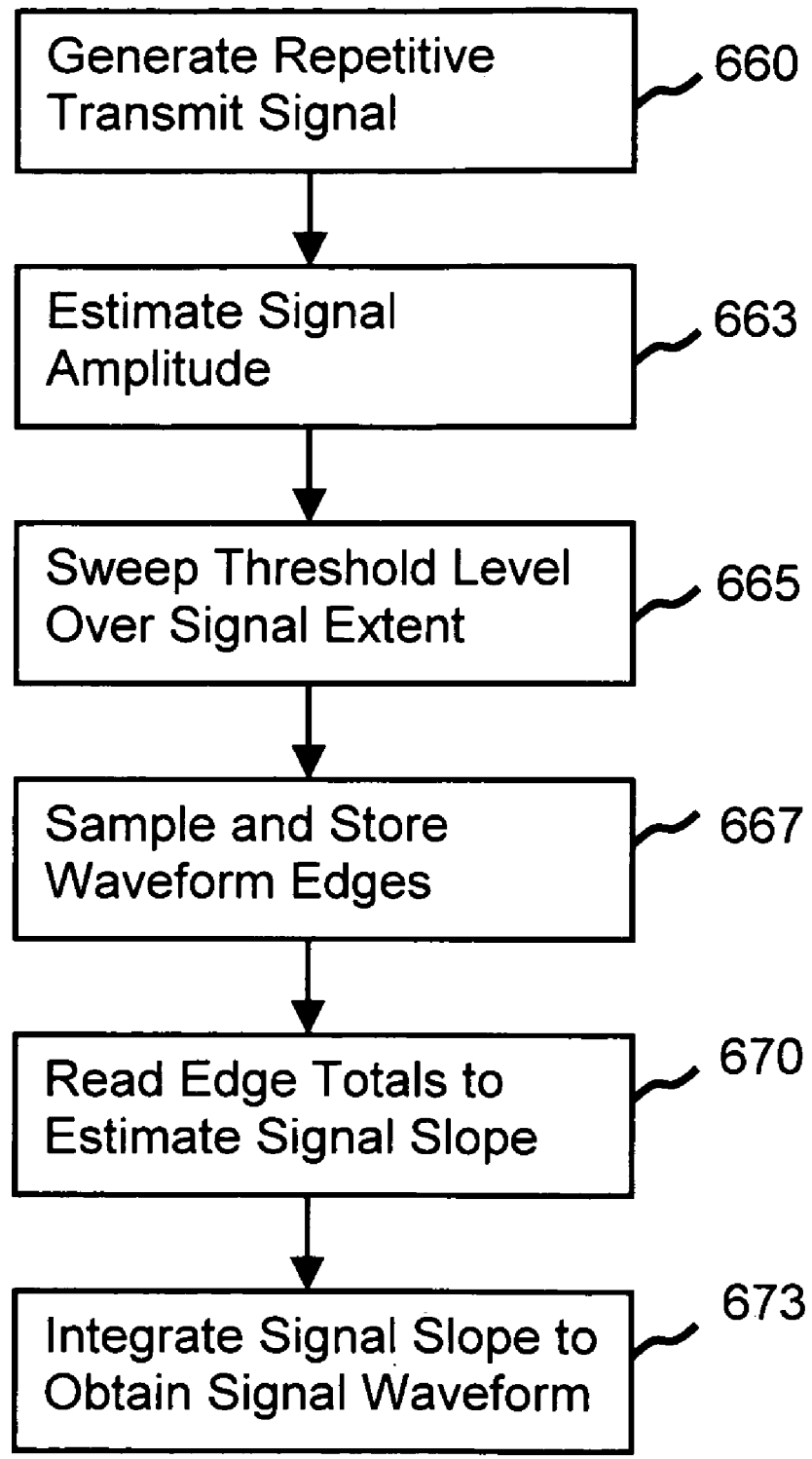
FIG. 16 details a flow diagram of an edge difference based signal extraction method.

FIG. 16 shows a flow diagram of a signal extraction method based on the difference in rising and falling edges. Control Engine 10 initiates the repetitive transmission of a modulated electromagnetic signal (Step 660) into a transmission channel 50. Based on an initial period of signal transmission, the control engine estimates received signal strength (Step 663) and calculates initial threshold offset and the necessary rate of change for the threshold. During signal acquisition the threshold is swept from the negative offset to the positive threshold offset level (Step 665). During this acquisition period the output of comparator 120 is sampled and the rising and falling edges are accumulated (Step 667). Based on the accumulated edge data, the signal slope is estimated (Step 670) at each sample point. Integration of the signal slope (Step 673) provides a means to reconstruct signal shape.

Figure 17:
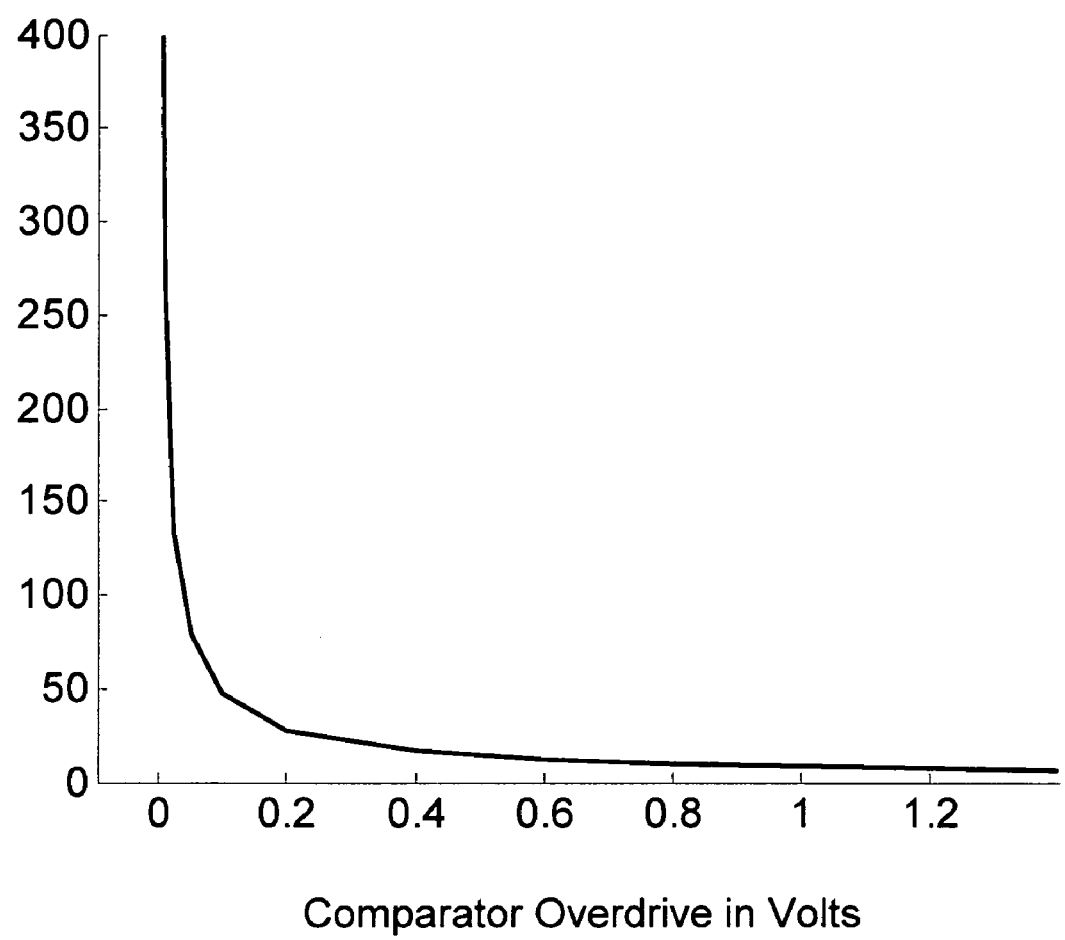
FIG. 17 illustrates signal comparator delay dispersion as a function of overdrive.

Large signal distortion is can be caused by variations in propagation delay in the signal detection comparator resulting from varying signal rise times. FIG. 17 illustrates signal comparator delay variation as a function of signal overdrive. When the rate of change the incoming signal is low, the experienced delay can be quite long. As the signal slew rate increases, the effective delay is reduced until it asymptotically approaches a minimum delay value. When the signal is embedded in noise, the effective comparator delay is long, but it results in minimal distortion since the average propagation delay is the result of the properties of system noise rather than that of the signal. Once the signal amplitude becomes significant relative to the noise, the effective propagation decreases resulting in slew rate dependent distortion.

Figure 18:
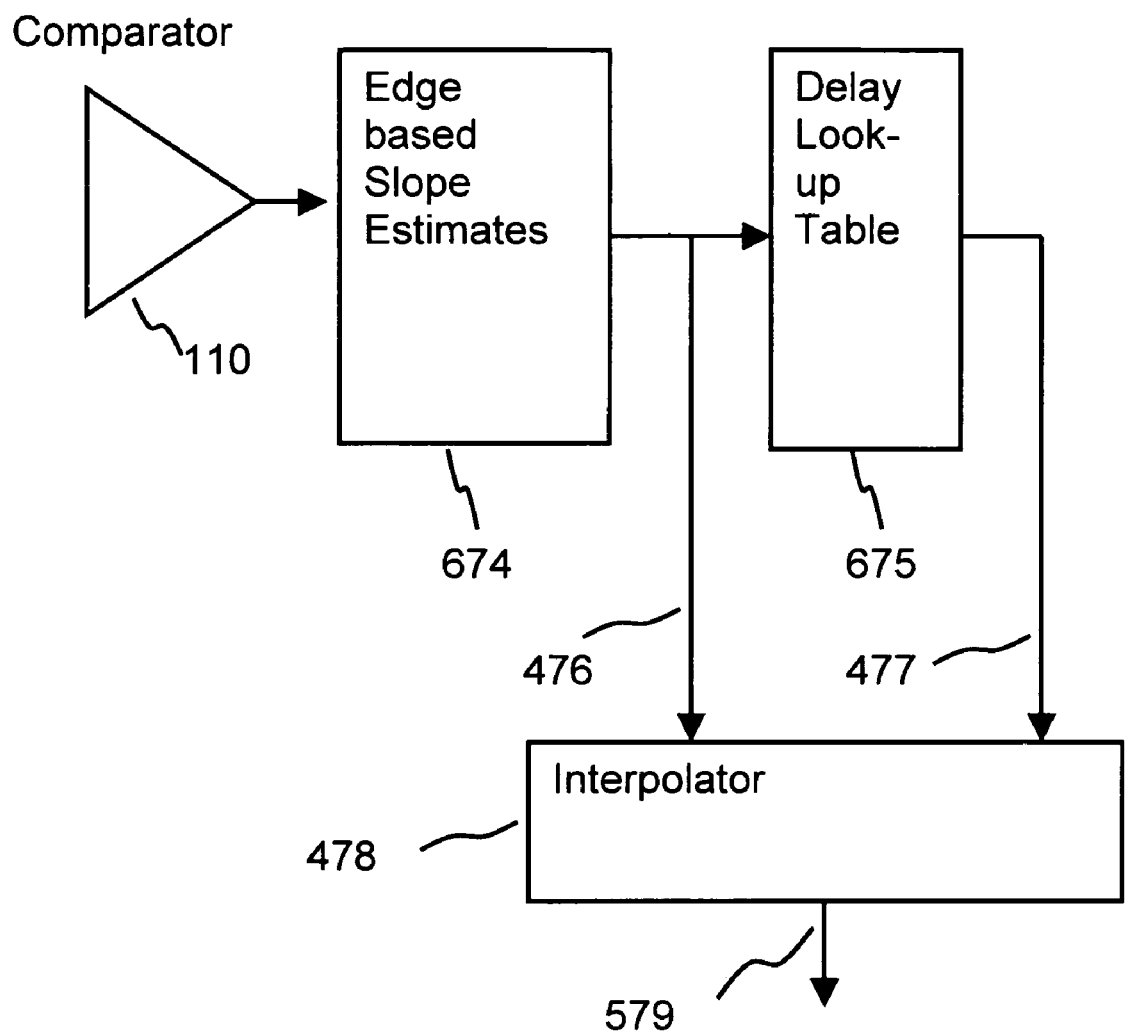
FIG. 18 shows a block diagram description of delay dispersion correction approach based on estimation of signal slope.

FIG. 18 shows a block diagram description of a delay dispersion correction approach based on estimated signal slope. The output of the comparator 110 feeds a logic signal into slope extraction block 674. The slope extraction element contains signal sampling, edge extraction logic, summation and processing to generate an estimate of signal scope based on the normalized difference in edge sums. A digital look-up table 675 converts the slope estimate into an estimate of relative comparator delay. The estimated slope 476 is delayed to remain correlated with the estimated comparator delay 477. Interpolator 478 corrects amplitude estimates based on the difference between the actual sample points and fixed time grid based on the slope and comparator delay estimates. Signal output 479 provides updated signal samples based on a uniformly separated time scale.

Figure 19:
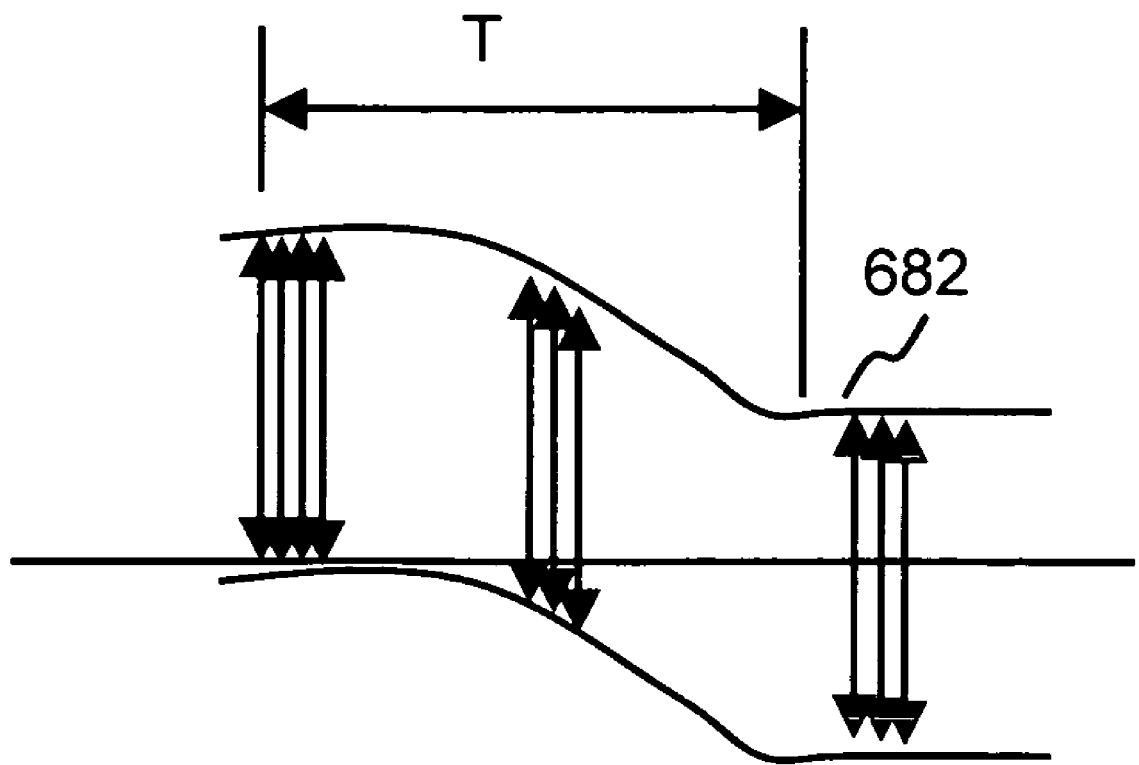
FIG. 19 shows the received signal burst transient decay behavior for AC coupled system.
Figure 20:
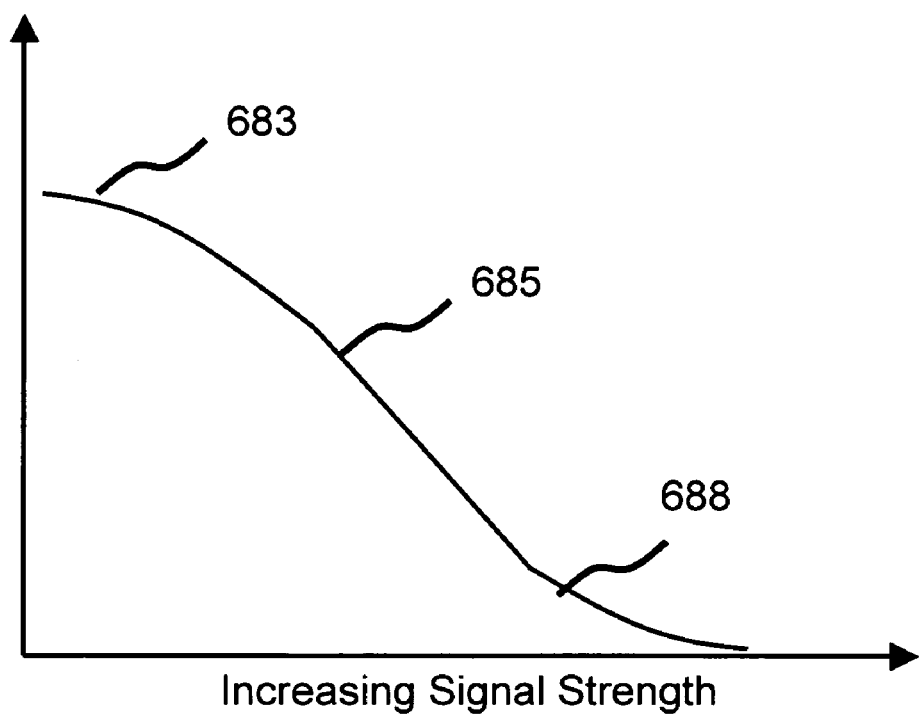
FIG. 20 shows the relationship of the total number of edge crossings verses received signal strength.

When implementing an optical a sensor system, a band pass filter characteristic is desirable in the receive signal path to eliminate DC base-line drift due to optical background variations. Since the optical transmit signal contains DC component, the received signal will exhibit transient signal decay with a time-constant dependent on the low frequency cut-off of the band pass characteristic. FIG. 19 illustrates this signal start up transient response. Signal waveform envelope 682 initially has a DC offset which decays to zero during the beginning of the acquisition period. Since the edge sampling and signal reconstruction process reject DC and lower frequencies, this decay behavior has no negative effect on the reconstructed waveform In one embodiment, edge-crossing data obtained during the transient decay of the signal envelope 682 shown in FIG. 19 can be used to help estimate received signal strength. During this decay interval, the signal threshold level is essentially sweep over half the signal range due to the decay of the initial DC offset. For a given signal pattern, the total number of edge crossings exhibits an inverse relationship with signal strength as shown in FIG. 20. At low signal levels, the graph segment marked 683 is flat illustrating that the crossing statistics saturate due to the dominance of noise. At medium signal levels the graph segment 685 exhibits an inverse relationship between edge totals and signal strength. At large signals, shown as segment 688, too few edges are available to estimate signal strength.

Figure 21:
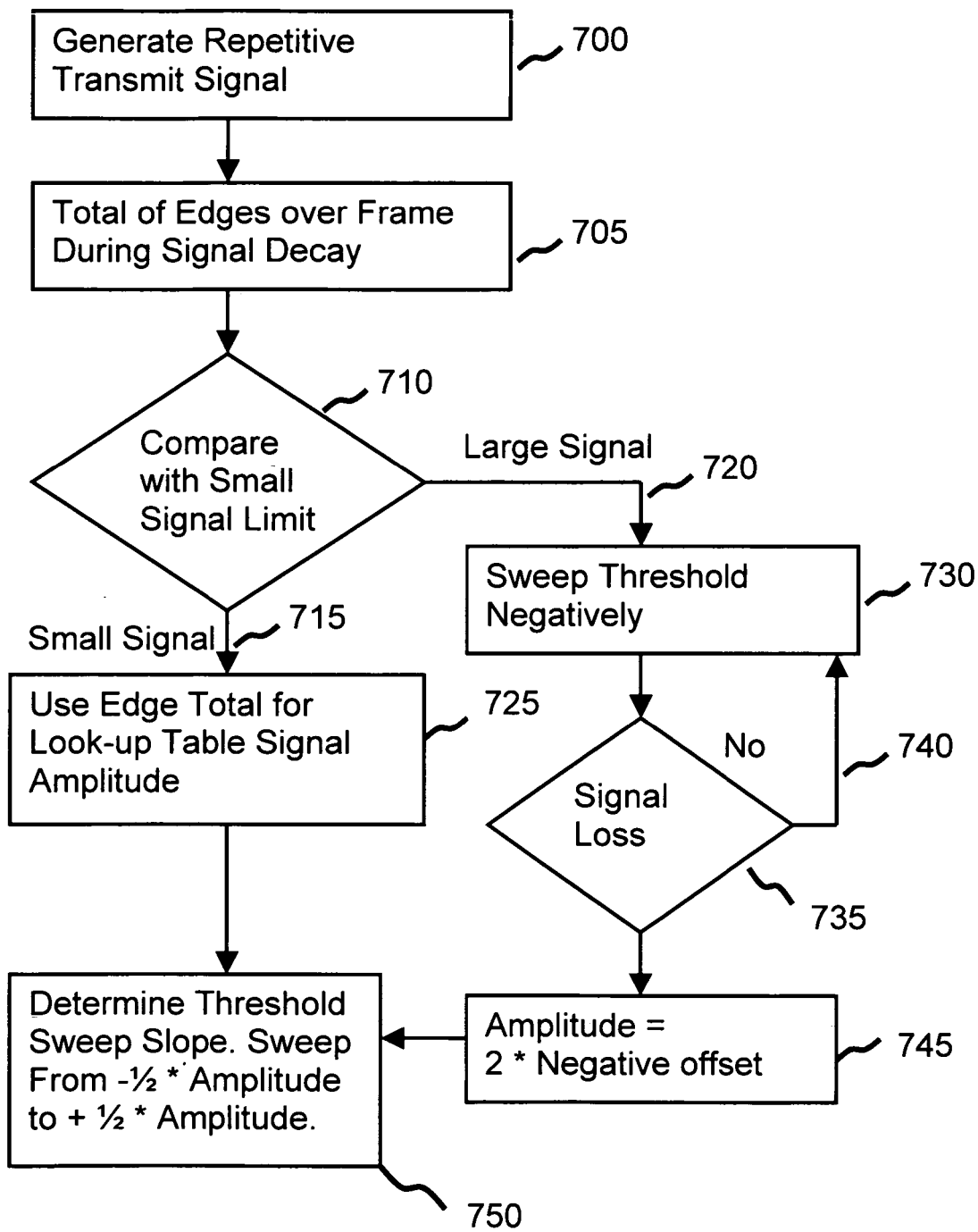
FIG. 21 illustrates an example processing flow for signal strength estimation.

FIG. 21 illustrates an example processing flow diagram for signal strength estimation and the calculation of initial threshold offset and sweep rate. Control Engine 10 initiates the transmission of repetitive signal packets (Step 700) from the transmitter. A band pass filtered received signal feeds comparator 110 which is sampled and accumulated by the edge sampler. The total number of edge transitions seen during the initial period of the signal decay are accumulated (Step 705) and compared to a small signal threshold (Step 710). If the total number crossing exceeds the small signal limit (Case 715) a look-up table is used to estimate signal strength (Step 725). If number of crossings is under the limit (Case 720) a large signal strength process is performed. During this process the threshold level is swept negatively (Step 730) until a loss of signal is detected (Step 735) initiating stop (indication 740). Signal loss is detected by a solid positive state of the comparator output. The Amplitude is estimated (Step 745) as twice the negative sweep of the threshold level performed during Step 730. Once the signal amplitude is determined, Step 750 calculates the rate of threshold sweep based on the total signal amplitude divided by the signal integration period.

Figure 22A:
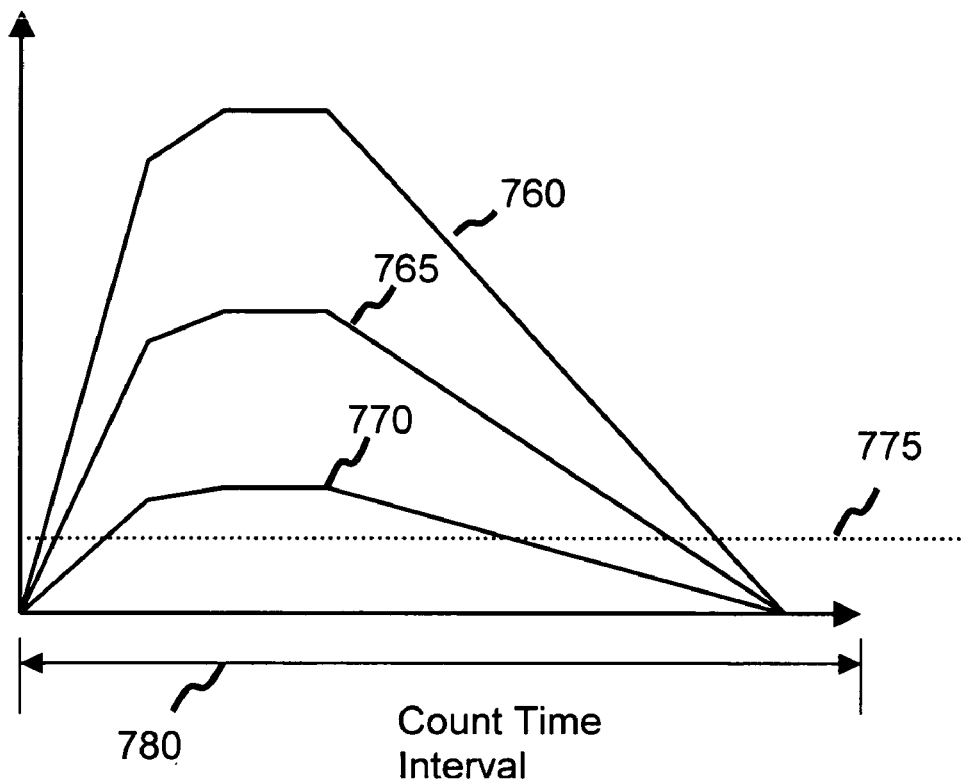
FIG. 22a shows a diagram of a representative signal strength measurement pulse with a linear shaped decay characteristic.

In an alternative embodiment, the transmitted pulse envelope may be short relative to the low frequency cut-off decay time, resulting in a minimal transient decay of the DC offset. This can be the case when using pulsed, edge emitting or surface emitting semiconductor lasers with a limited on-state duty cycle. In these cases, rather than measuring the natural decay of the signal envelope, a separate shaped pulse with an offset detection threshold is used to measure signal strength. FIG. 22a shows a diagram of a representative signal strength measurement pulse with a linear shaped decay characteristic to allow direct measurement of signal strength from the measured decay time. Signal pulse 760 shows a waveform with a rapid rise and linear decay. Signal pulses 765 and 770 show the signal pulse scaled to represent weaker return signals. Threshold level 775 is offset approximately by to a 2-sigma relative to zero baseline level. This enables signal detections at low-signal levels while providing a roughly linear change in detections with increasing signal strength. Detection count interval 780 is a fixed time period over which detections are accumulated.

Figure 22B:
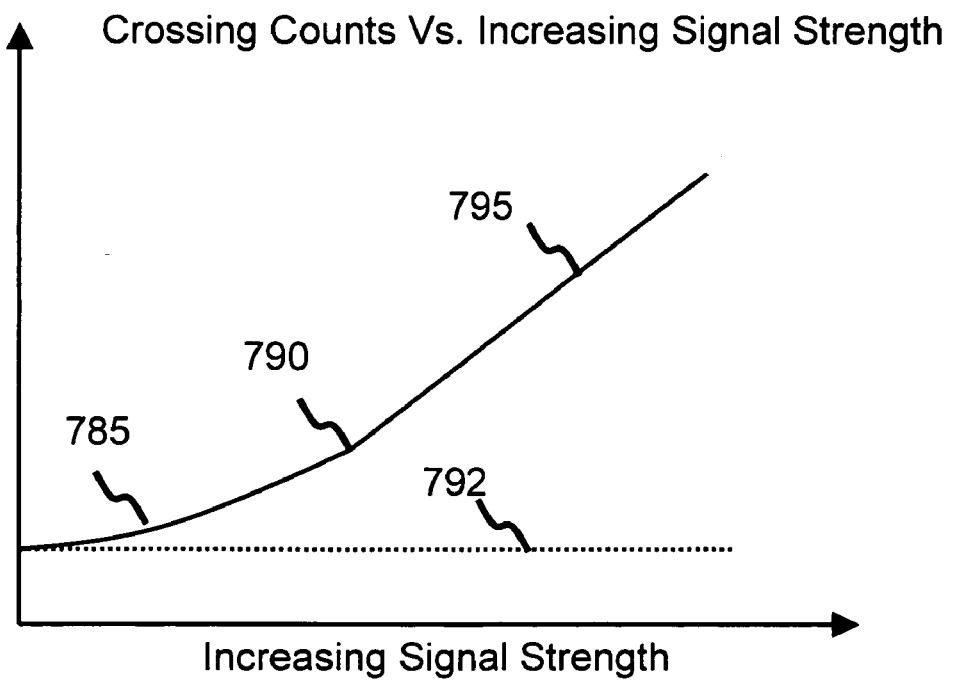
FIG. 22b shows the variation of detected signal counts verses signal strength.

FIG. 22b shows the variation of detected signal counts verses signal strength over a fixed integration time interval. Under strong signal conditions, graph segment 795 exhibits a linear change in count values as the signal strength is reduced. At inflection point 790 the slope of the curve changes reflecting additional counts due to noise. Below this level, graph segment 785 exhibits a decaying exponential behavior approaching an asymptotic value 792, depending on the statistics of the noise.

Figure 23:
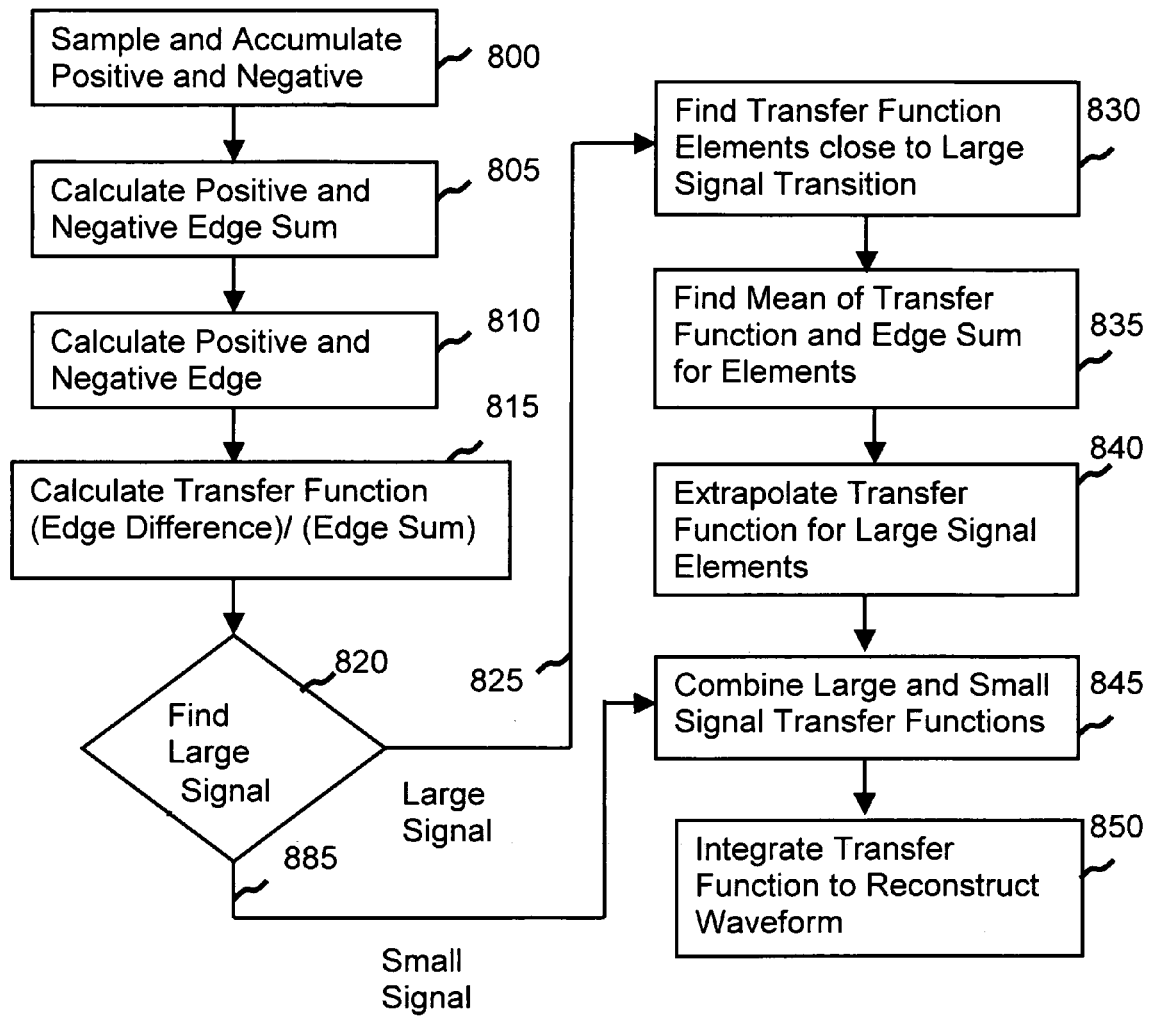
FIG. 23 describes process flow for slope based waveform extraction.

FIG. 23 describes the process steps for waveform extraction based on accumulated rising and falling edges with accommodation for large signal behavior. Accumulated sums of rising and falling edges are stored for further processing (Step 800) by the control engine 10. Positive and negative edges are summed (Step 805) and differenced (Step 810) as intermediate steps prior to division of the edge difference divided by the edge sum (Step 815). The resulting transfer function provides relative slope information between 0 for no slope and +/−1 for saturated positive and negative slope indications respectively. The function can be described by a gaussian error function which remains roughly linear until the saturation occurs at transfer function values above 0.9-0.95. To detect this transition into non-linear behavior, the absolute value of the transfer function is compared against a small signal limit (Step 820) and sample values above the limit (Case 825) are identified. For large signals, the sum of edges are used rather that the edge difference due to a linear relationship between the total edge sum and the signal slope once the number of edges due to signal dominate over the contribution due to noise. The linear extrapolation of transfer function values into a large signal regime require normalization of the edge sum relative to the transfer function values. To accomplish normalization, sample points with transfer function values near saturation are identified (Step 830). Samples with transfer function between 0.8 and 0.95 are identified and the mean of the transfer function and their associated edge sums are averaged (Step 835). Extrapolated transfer functions are calculated (Step 840) by the multiplying the edge sums at large signal points by the (mean of the transfer function)/ (mean of the edge sums). The extrapolated transfer values at the large signal point replace the previous values (Step 845) and the slope estimates are integrated over the sample window (Step 850)

Figure 24:
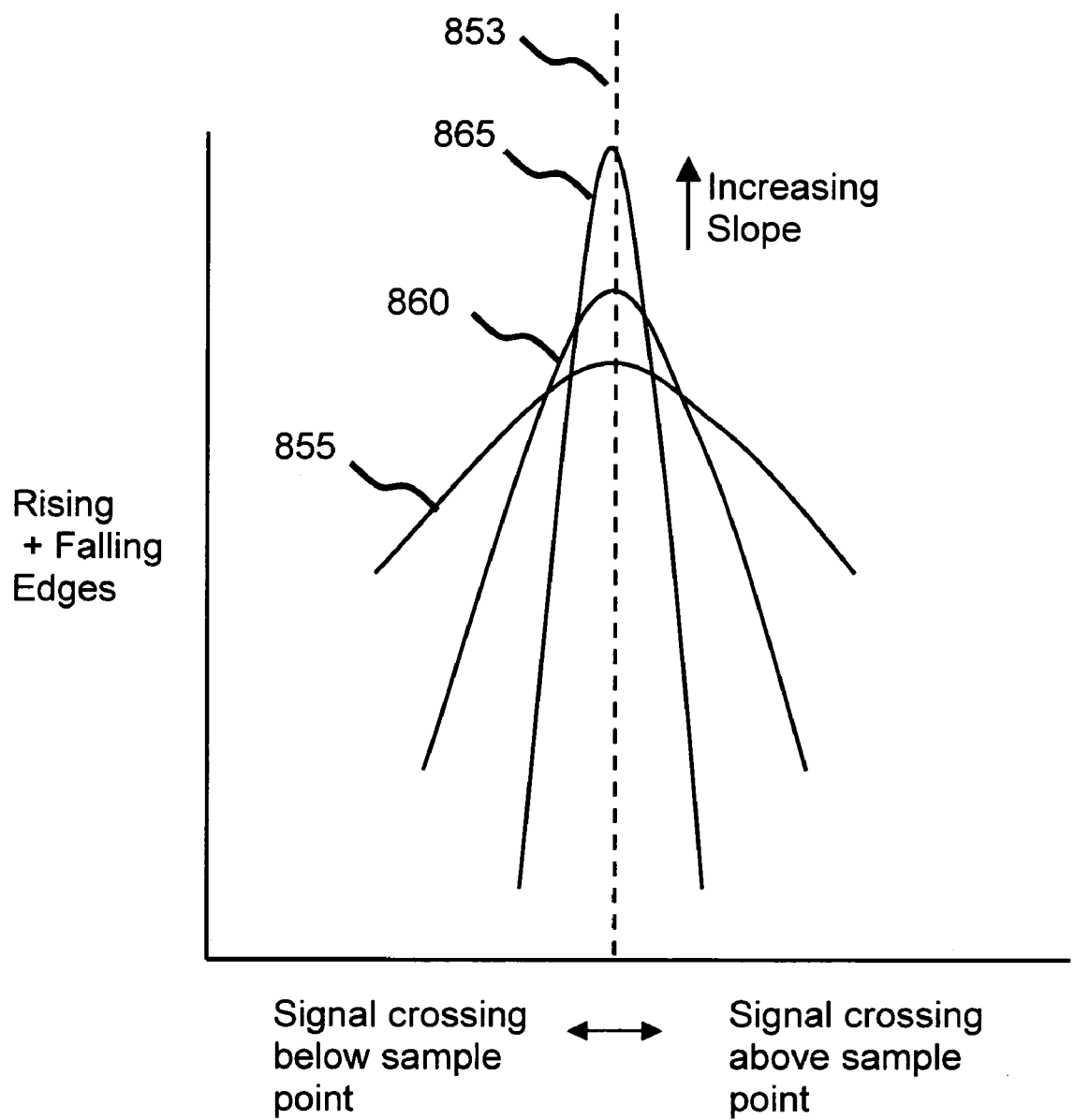
FIG. 24 shows the behavior of the edge sum with increasing signal slopes.

An improved embodiment on the previous edge-processing method preserves the incoming signal's DC and low frequency components by observing the rate of change in the sum of positive and negative edges as the threshold is moved through the signal envelope. The threshold slicing level is moved through the waveform while gathering data on the sum of rising and falling edges. The number of total rising and falling crossings follow a gaussian distribution with a distribution peak at the effective point where the threshold crosses the signal point. The crossing point can be estimated by interpolation of crossing rates above and below the crossing point FIG. 24 illustrates the behavior of the edge sum as the threshold level crosses the signal. The vertical dotted line 853 indicates the value of the signal at a given sample point. Waveforms 855, 860, 865 show the relative rate of change of the sum of rising and falling edges for signals of progressively increasing slopes. Waveform 855 represents the signal of lowest slope and exhibits a smaller rate of change of the edge sum as the threshold approaches the signal value. As the slope progressively is increased, as represented in waveforms 860 and 865, the edge crossing distribution becomes more peaked as the edge crossings become more concentrated over a narrower range of time. Once the majority of crossings occur within a single sample interval, the peak of the edge sum distribution saturates at the number of averaged signals, creating ambiguity on the peak crossing location.

The simplest method to locate the peak of the edge sum distribution is to measure the rate of the edge-crossing sum as the threshold moves through the signal crossing point. The location of the point where the edge sum rate inflects, identifying the peak of the distribution. Two approaches can be used to sweep the threshold over the extent of the signal. The threshold can be varied in discrete amplitude steps or continuously.

Figure 25:
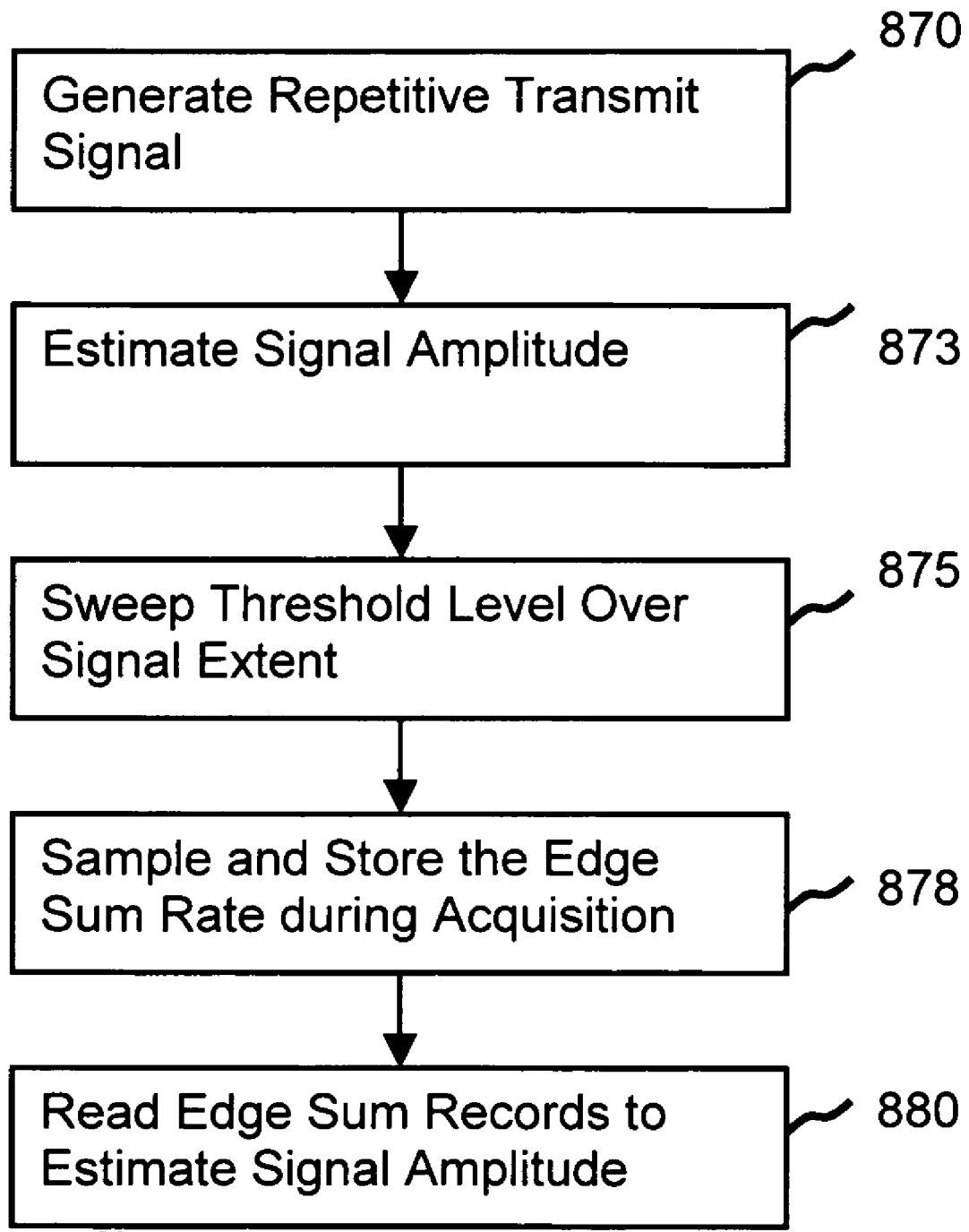
FIG. 25 shows the general process flow for signal amplitude estimation.

FIG. 25 shows the process steps for signal amplitude estimation based on the total number of crossings as the threshold is moved through a crossing point. In common with the previous process for signal slope estimation, Control Engine 10 initiates the repetitive transmission of a modulated electromagnetic signal (Step 870) into a transmission channel 50. Control engine estimates received signal strength (873) based on an initial period of signal transmission, calculates initial threshold offset and the necessary rate of change for the threshold. As the threshold is swept from the negative offset to the positive threshold level (Step 875) the output of comparator 110 is sampled and the sum total of rising and falling edges are accumulated and the edge sum rate of change is calculated at discrete times during the threshold sweep (Step 878). Based on the accumulated edge sum data at two or more threshold amplitudes during the acquisition, the signal amplitude is estimated (Step 880).

Figure 26:
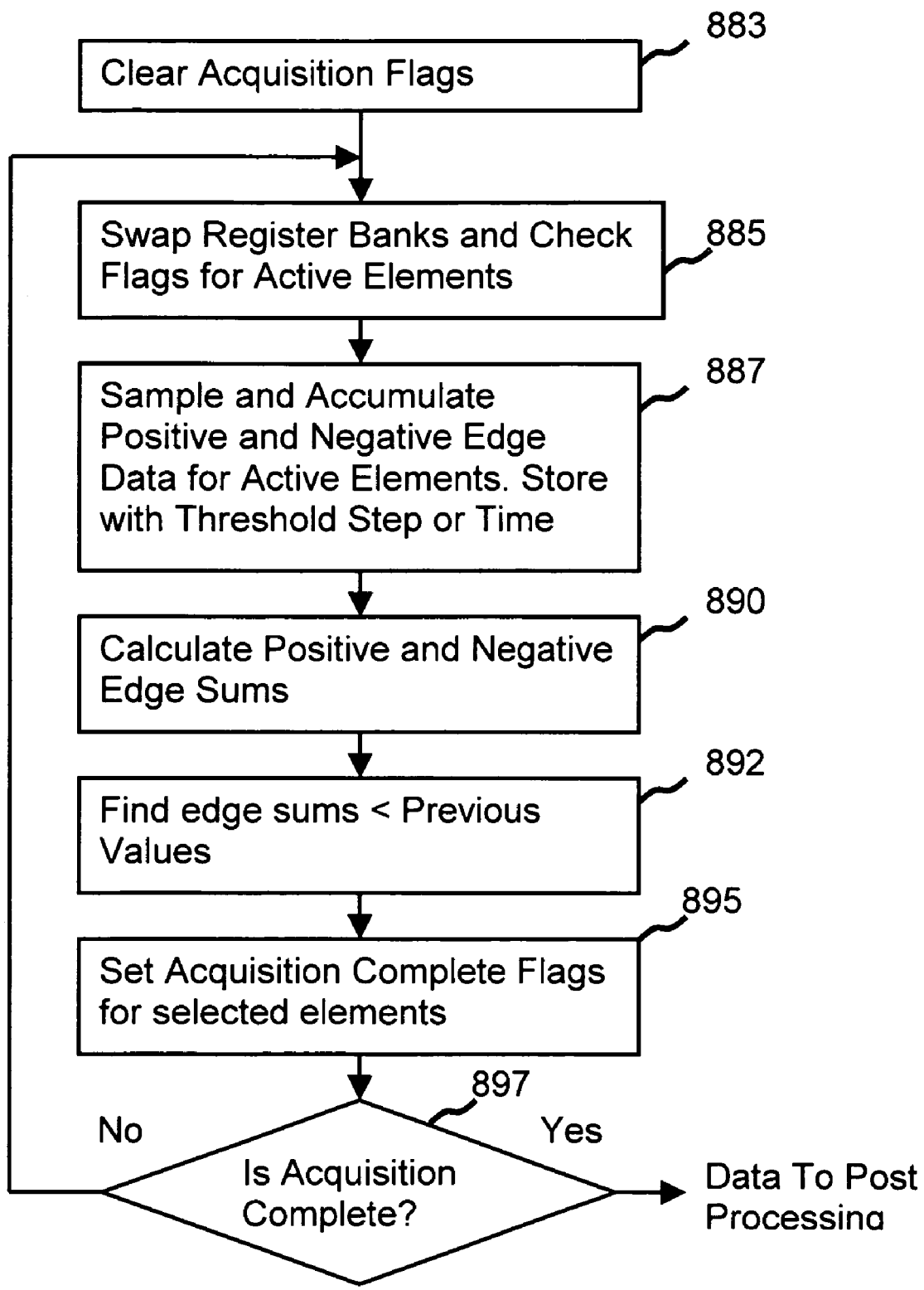
FIG. 26 details the process flow for edge sampling and edge sum rate calculation and storage

The process step for edge sampling and edge sum calculation and storage are shown in FIG. 26. Before the start of signal acquisition, acquisition status flags for each sample point are initialized into an unset state (Step 883). A pair of register banks is used to store intermediate rising and falling edge summations. At the beginning of each acquisition, status flags are checked and the active storage register location is switched (Step 885) to prevent overwriting the last stored data. With each intermediate acquisition new rising and falling edge summations are stored in active elements within the bank. Elements that are inactive have set acquisition complete flags that indicate that edge rate peak edge sum data has been captured. At the completion of an intermediate acquisition the rising and falling edge sums are added (Step 887) and compared to previous edge sum values (Step 892). Elements that have edge sums less than the previous sum values are identified and associated flags are to set (Step 895) to inhibit further updates of sum as the acquisition process proceeds. The acquisition flags are checked to determine if the acquisition is complete (Step 897). Once all flags are set, indicating all the edge rate sum peaks have been identified, the acquisition is completed and process flow moves the estimation of the signal amplitude.

Figure 27:
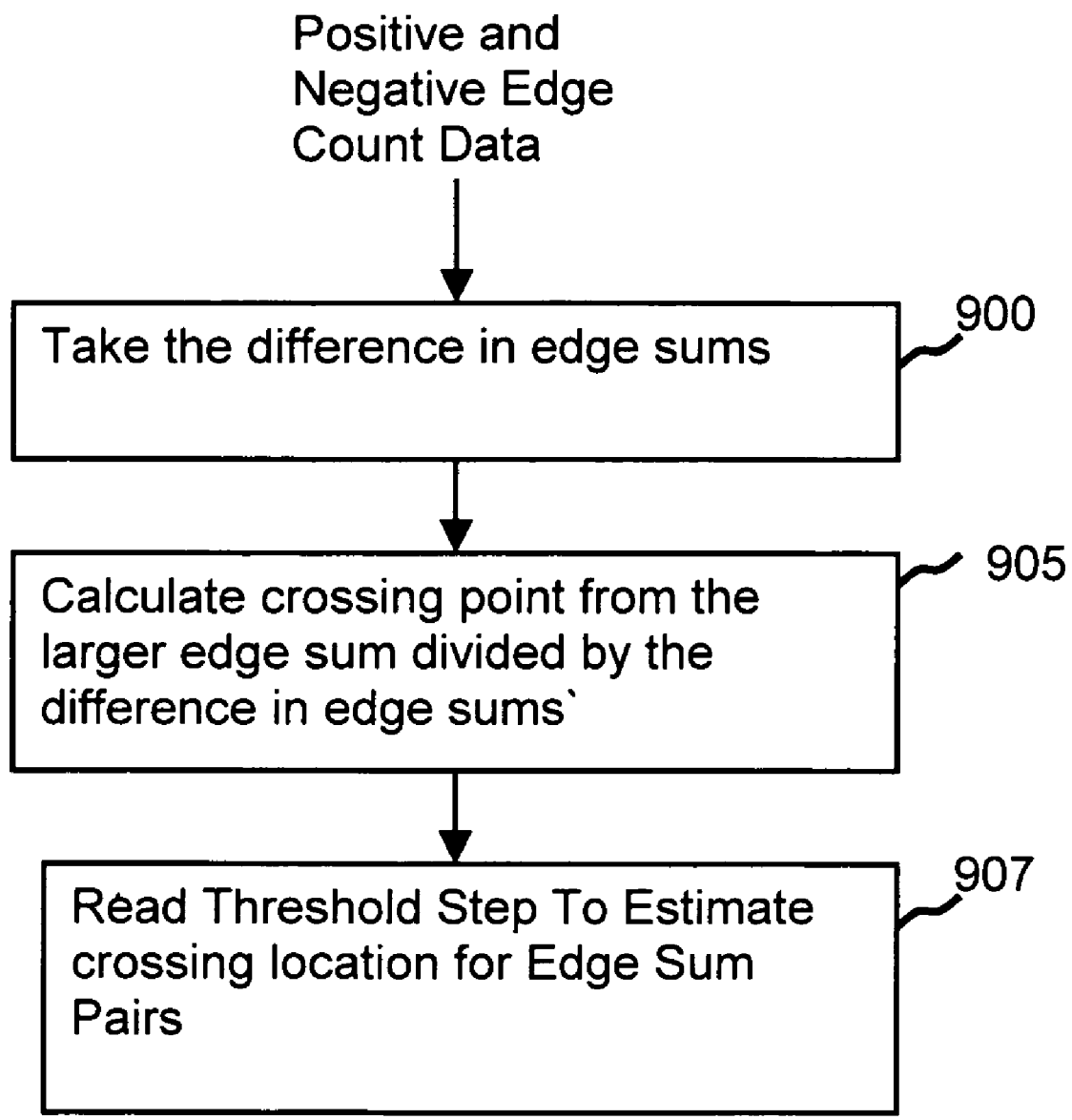
FIG. 27 shows the amplitude estimation process flow associated with edge sum acquisition process.

The amplitude estimation process flow associated with edge sum based acquisition process is shown in FIG. 27. Stored edge sum pairs and associated threshold indexes are transferred to a working memory for further processing. For each time point, two sums are present representing edge sum on either side of the peak of the crossings distribution. As discussed previously, the sum of the rising and falling edges will follow a gaussian distribution with the peak location located at the zero crossing of the signal. The difference between each pair of edge sums is calculated (Step 900) and the larger value is divided by the difference to estimate the peak crossing (Step 905). The threshold step is added to the interpolated crossing location to provide an estimate of signal amplitude (Step 907).

Figure 28:
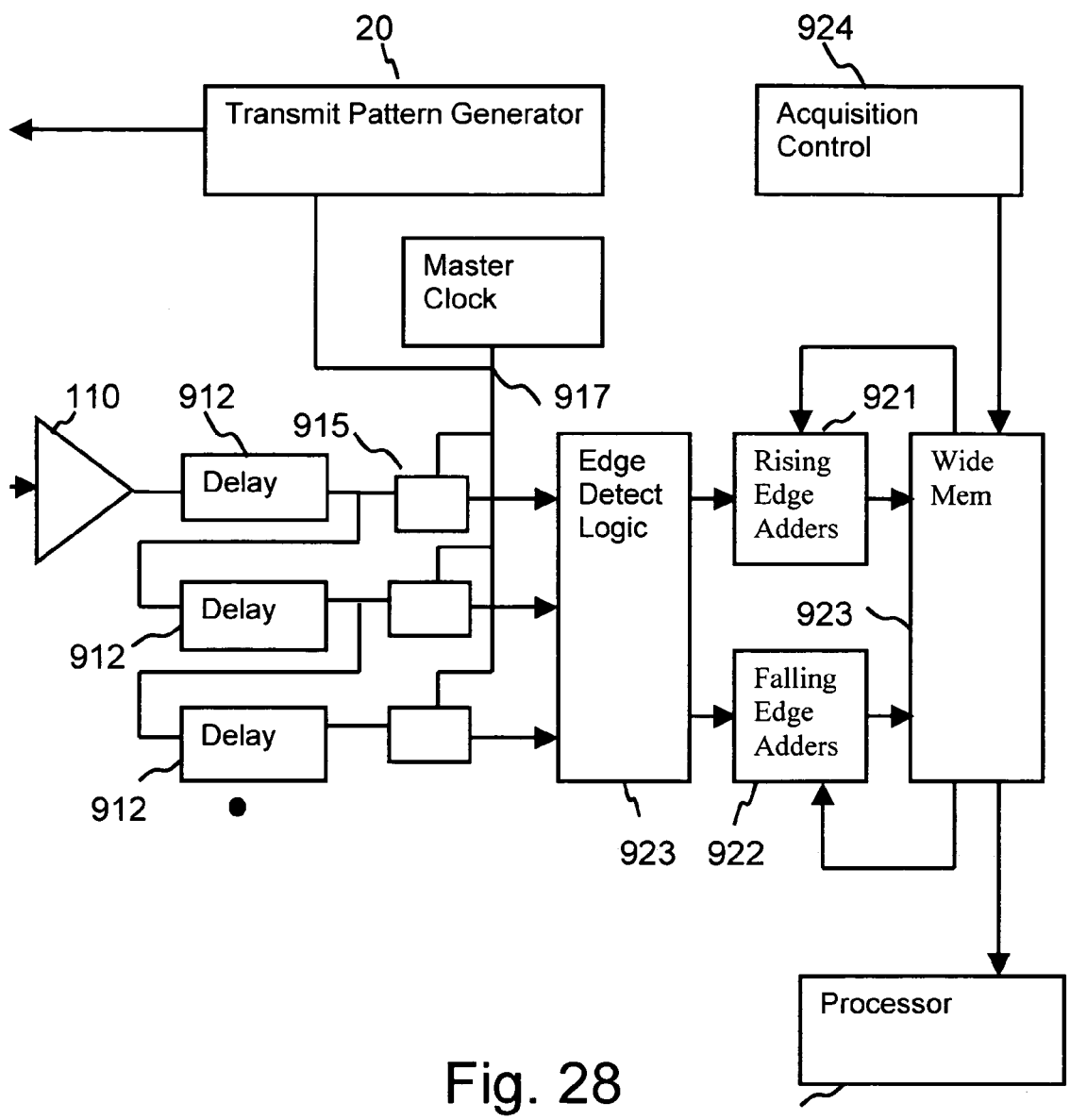
FIG. 28 shows a block description of an embodiment to capture edge-crossing data.

FIG. 28 shows a block description of an embodiment to capture edge-crossing data from the return signal exiting the signal comparator. The signal detection comparator 110 converts the incoming analog signal into a one-zero pattern. A tapped delay line 912 feeds the digital signal with progressively longer propagation delays to multiple sampling latches 915. The delay line provides an increase in the effective sampling rate by the number of taps. The sampling latch is synchronized by a master clock 917 with the transmit signal generator 20 insuring that the sampling remains correlated to the outgoing transmit pattern. Edge detect logic 918 identifies the presence of a rising or falling edges for each sample pair. A pair of adders 921 and 922 increment associated pairs of rising and falling edge storage registers stored in the wide memory 923. Acquisition Control 932 increments the address in the wide memory on every clock cycle updating the registers accessed by the rising and falling adders. At the completion of an acquisition cycle, the Processor 925 accesses the rising and falling edge sums to recover the return wave shape.

Figure 29:
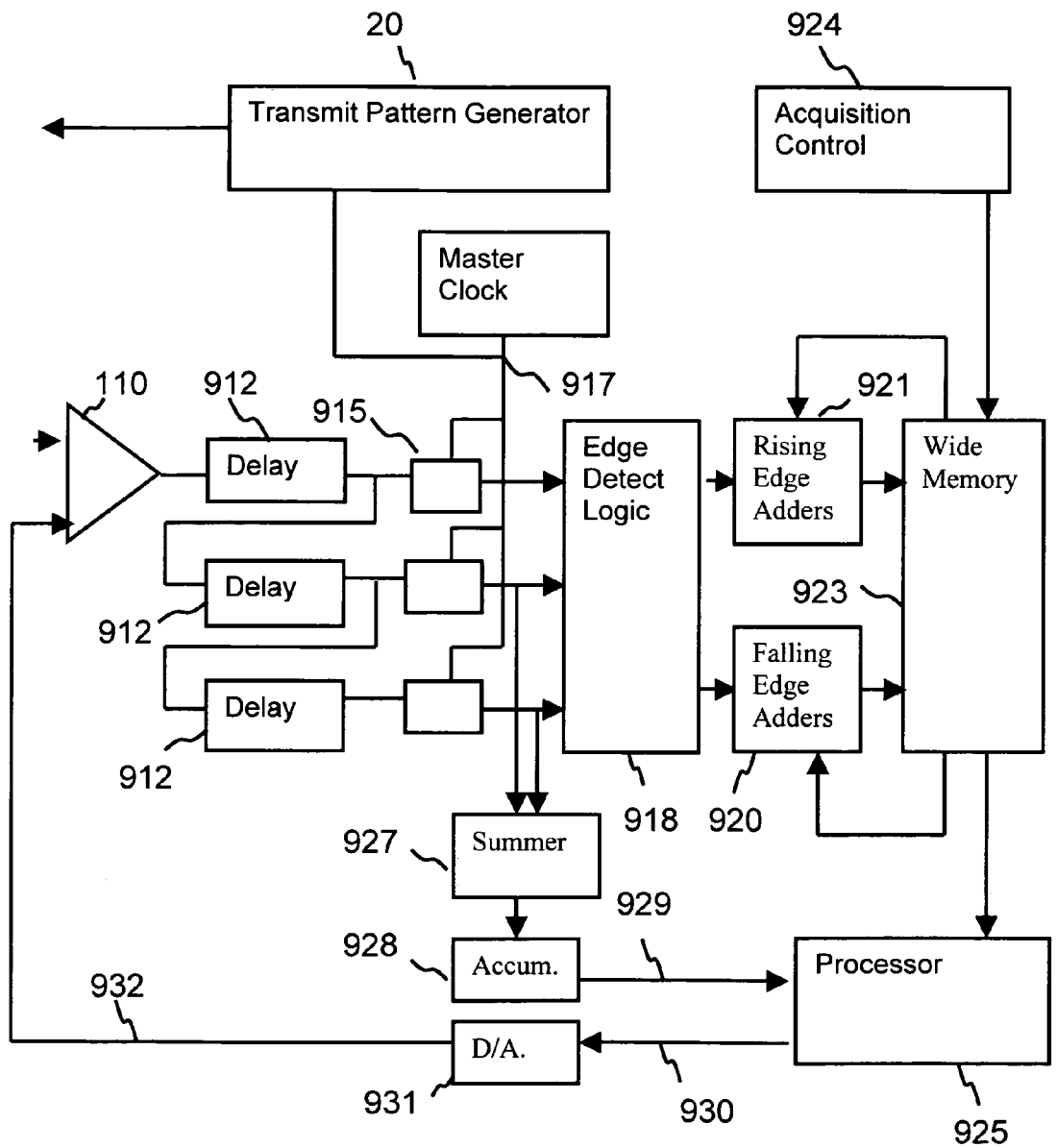
FIG. 29 shows a block description of an alternate embodiment that sweeps the threshold level on the comparator reference based on the detected signal strength.

FIG. 29 illustrates an improved embodiment of the edge-based sampler using a varying threshold level on the comparator input to improve dynamic range. Sampled delay line outputs originating from the output of latches 915 feed summer 927. The summer provides the total of the high logic states captured within a single clock period. Accumulator 928 adds successive summer totals over a given integration period established by processor 925. At the completion of an integration period the processor reads the accumulator value and clears it's value in preparation for the next accumulation cycle. In the processor the accumulator value is converted into an estimate of signal strength using a look-up table or piecewise correction function. Based on measured signal strength, a D/A converter 931 is driven with a digital ramp waveform 930 to implement a sweep of the comparator reference signal 932 through the signal envelope over the duration the signal integration period.

Figure 30:
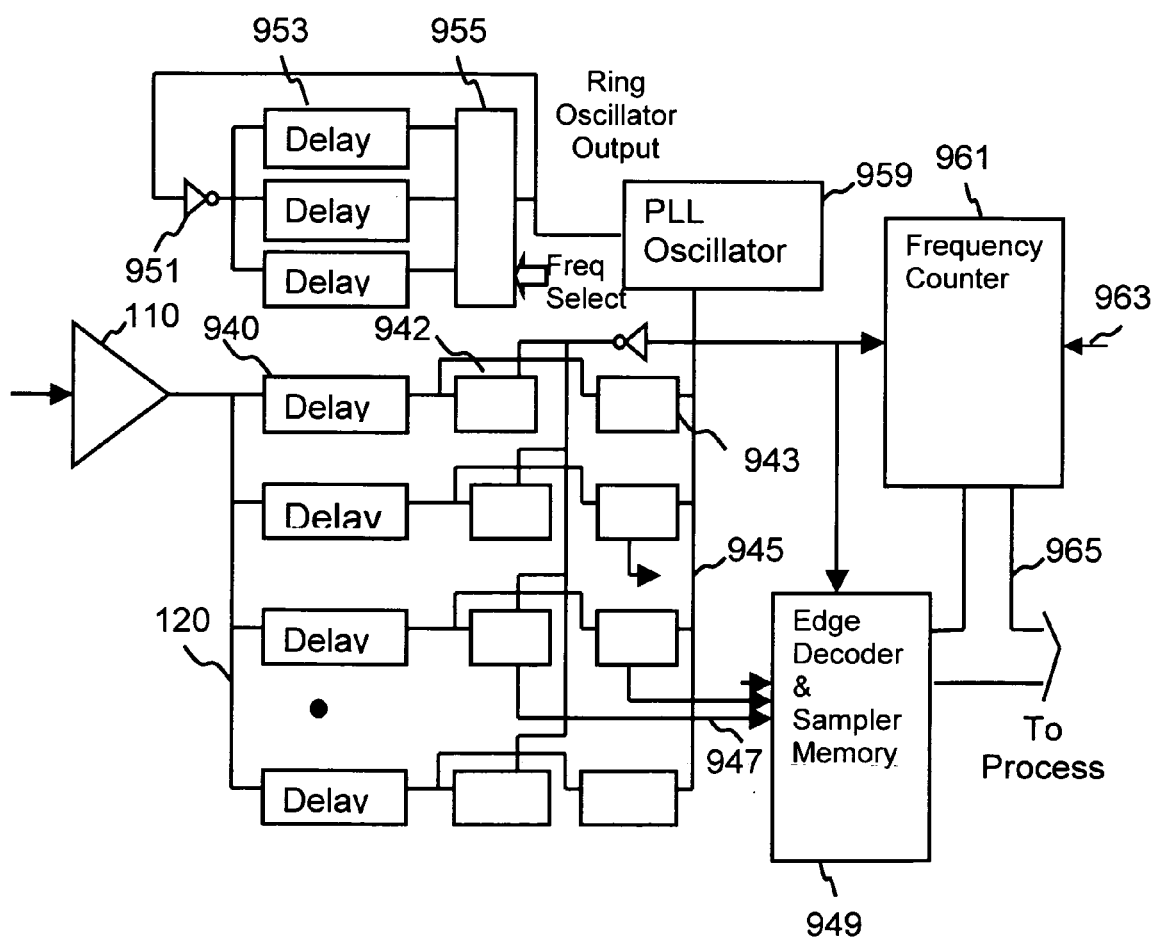
FIG. 30 shows a block diagram a delay line sampler with an independent oscillator.

FIG. 30 shows a block diagram of an alternate embodiment delay line sampler with an independent oscillator to allow signal transmission and acquisition at a different frequency from the system master clock. Often master clock noise present in a system is sufficient to interfere with signal detection. Transmission and reception at a slightly different frequency from the master clock prevents this noise from being integrated synchronously with the return signal. Containing this shifted frequency oscillator within the processing IC minimizes the likelihood of leakage into the receiver signal chain. Comparator 110 produces a single bit binary stream 120 passing to parallel sets of progressively longer delay lines 940. The output from each delay element passes to pairs of latches. Latches 942 and 943 capture data on falling and leading edges of clock signal 945 respectively. The latch outputs 917, processed by the edge decoder 949, provide data accessible to a processor through data bus 965. For easy implementation in an IC or field-programmable-gate-array, a ring oscillator can be used to provide the shifted time base. Inverter 951 in conjunction with delay lines 953 provides variable oscillating frequencies based on the delay selected by data multiplexer 955. A phase lock loop or a narrow band ringer circuit 959 can be used to minimize short-term phase variations of the ring oscillator output. Frequency counter 961 measures the free-running frequency of the local clock based on a master clock 963 to allow for the future conversion of measured parameters back to the main time base.

Figure 31:
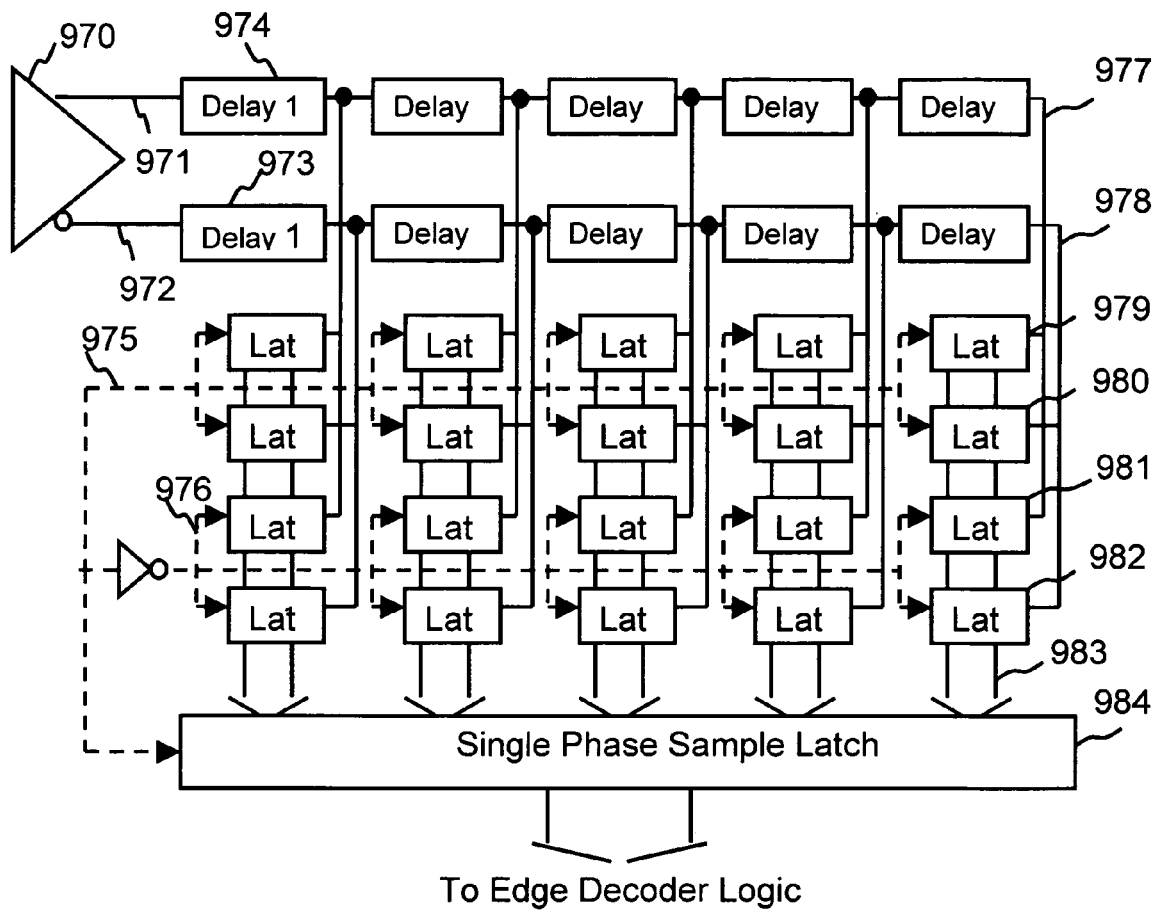
FIG. 31 shows a delay line embodiment that eliminates rising and falling delay asymmetry.

In practical implementations of on-chip delay lines, an asymmetry is often present between the propagation delay for rising and falling edges. For implementation of longer delays (10's nanoseconds or more) the cascading of larger numbers of gate delays may aggravate this problem. FIG. 31 shows a delay line embodiment that cancels rising and falling delay asymmetry by sampling the logic state of two complementary delay lines with post processing used to remove logic state ambiguities. Differential buffer 970 produces buffered signal 971 and its complement 972. These signals feed a pair of matched tapped delay lines 973 and 974. Latches driven by rising and falling edges of the sampler clock are used to sample each tap. The last tap of the delay lines signals is described as signal 977 and the complemented signal 978 feed latches used for data capture. Rising edge clock drives latches 979 and 980 while the falling edge drives latches 981 and 982. The outputs of the latches 983 are synchronized to signal phase latch 984 for processing by the edge decoder logic.

Figure 32:
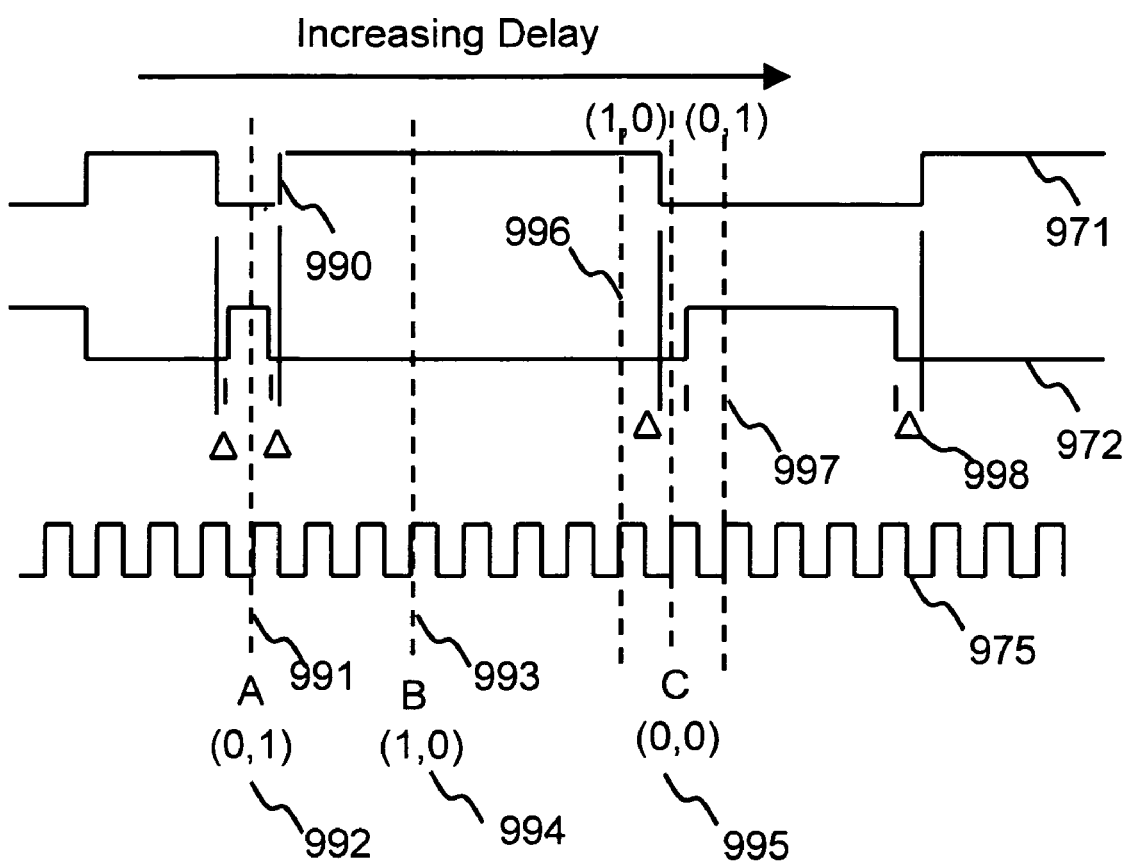
FIG. 32 shows waveform asymmetry at progressively increasing delay within the delay line networks

FIG. 32 shows an example of rising and falling edge asymmetry at progressively increasing delay within the delay line networks of the previous figure. After a short delay in the network, an asymmetry can be seen between rising and falling edges at point 990. This represents the case where falling edges experience a larger delay than rising edges resulting in a relative stretching of negative pulses in the non-inverted signal 971 and a shortening of positive pulses in the complementary waveform 972. The logic state at sampling point 991 is shown as an unambiguous state (0,1) 992. At sample point labeled (B) 993 the logic state represents the opposite unambiguous state 1,0 labeled 994. At sampling point labeled C an ambiguous state (0,0) 995 is present due delay shift of the edges at the sampling position. Looking at the previous and following sample points labeled 996 and 997 respectively can resolve this intermediate logic state. In this case the ambiguous state can be forced to the previous or following state by convention. Forcing the state (1,0) effectively takes the shorter delay of the two delay lines while forcing it to the following state (0,1) takes the longer. The ambiguous state could also be (1,1) can be also resolved in the same fashion.

An alternate embodiment of an edge summation process reduces the number of adders necessary to accumulate the edge sums while also decreasing the word size of the edge count memories. When delay lines are used to provide data sampling at a multiple of the clock rate, a bottleneck is introduced at the edge summer. If we assume a 8 tap delay line and a 12 bit edge sum than the adder and associated memory will need to be total 8*12*2 or 184 bits wide. This width can be halved by alternating additions of rising and falling edges between acquisitions and through the addition of bit pipeline memory to carry edge data to the next cycle when its state does not match the present edge being stored.

Figure 33:
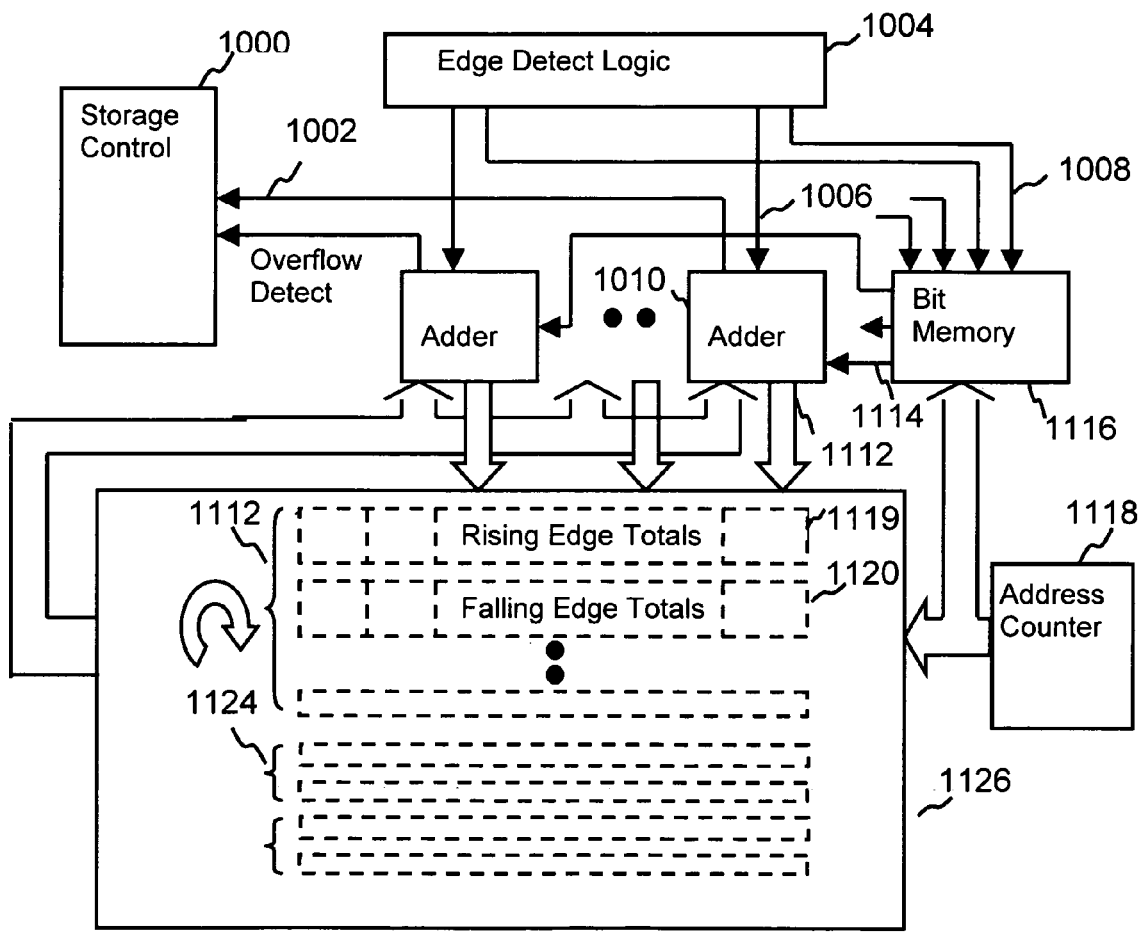
FIG. 33 shows a block description the edge summer embodiment that reduces memory width and the required number of adders FIG. 34 describes the process flow for the improved edge-summing network.

FIG. 33 shows a block description the edge summer embodiment that reduces memory width and the required number of adders. Edge detection logic 1004 outputs rising and failing edge information for each delay line sample point. Based on the state of the adder (processing rising or falling edge) and a matching sampled edge state, an increment command 1006 signal is passed to the associated adder 1010. If the a edge detection state is mismatched, as in the case of falling edge occurring when rising edges are summed, a bit carry signal 1008 is passed to the bit pipeline memory 1116. When no edge transition is detected both the carry and increment command is set to zero. The output of the bit memory 1114 presents the state of the associated carry bit during the acquisition of the opposite edge. The address counter 1118 provides the address for both the bit memory and edge sum memory 1126. The edge sum memory is organized in selectable banks represented as 1122 and 1124 and within each block alternating memory blocks contain rising 1119 and falling 1120 edge sums. In the case where a counter overflow, overflow detect 1002 passes a signal to storage control 1000. The presence of an overflow condition may indicate an error or initiate a bank switch to a new set of memory resisters essentially allowing the continued summation of edge information.

Figure 34:
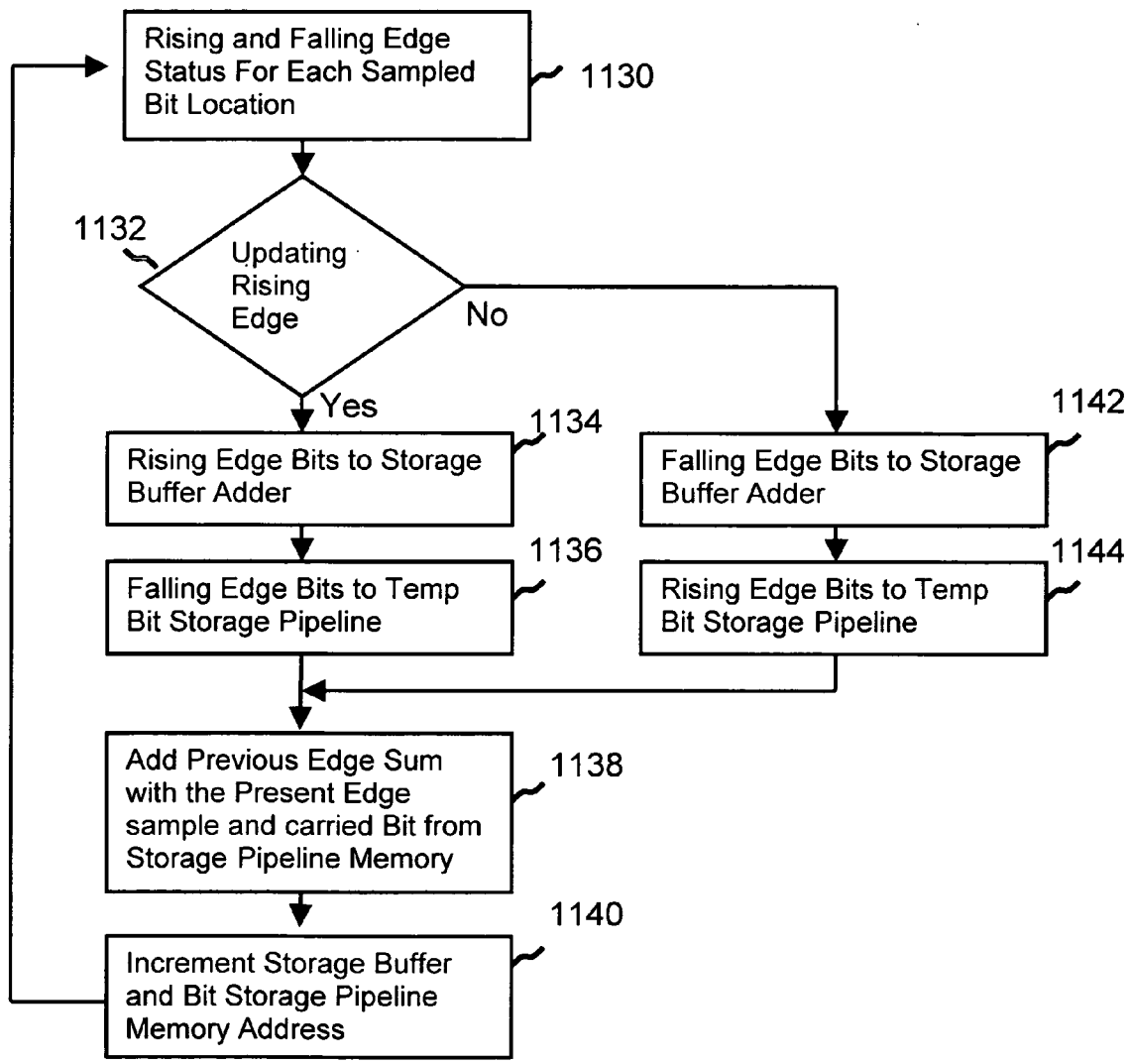

FIG. 34 describes the process steps for the improved edge-summing network for reducing the required memory width and number of adders. At each sample point the presence of a rising or falling edge is decoded (Step 1130). The edge state at each point is compared with the adder state (Step 1132). The adder is either summing rising or falling edges. If rising edges are presently being summed, locations with rising edge status are passed to the adders (Step 1134) and Falling edge status locations are passed to the bit storage pipeline (Step 1136). Conversely if falling edges are presently being summed, locations with falling edge status is passed to the adders (Step 1142) and Falling edge status locations are passed to the bit storage pipeline (Step 1144). In Step (1138) the values stored in the addresses edge sum registers are added with the present edge samples and carry status from the bit storage pipeline memory. After completion of each summation cycle the address of the rising and falling edge and bit storage pipeline memories are incremented (Step 1140)

Figure 35:
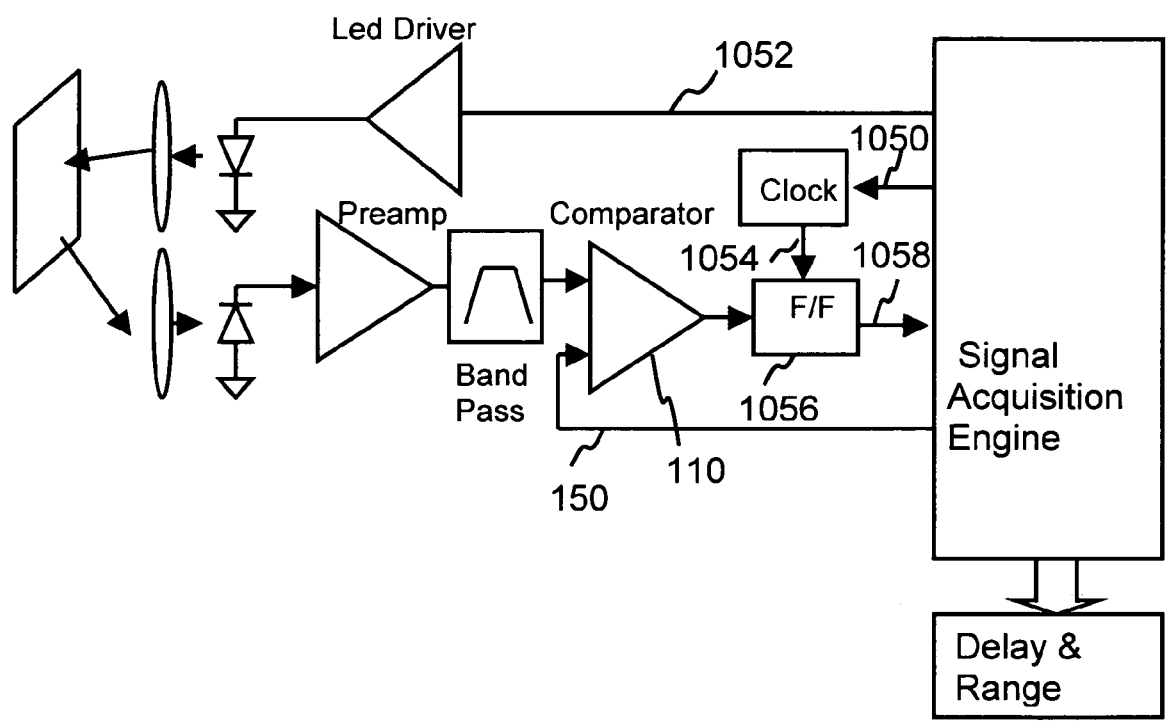
FIG. 35 shows an improved sensor embodiment using an external data synchronizer.

FIG. 35 shows an improved embodiment using an external data synchronizer between the signal detection comparator and the edge sampler. Improvement in sampling performance can be achieved by the placement of a data sampling latch prior to the edge sampling. The sampling of the comparator output with a clock reference at the desired system sample rate eliminates the effect of jitter caused by downstream non-uniform sampling points in the edge sampler. As long as the pre-sampling occurs roughly 180 degrees away from the nominal sampling points of edge sampler and the envelope of sampling error is less than the sample period, sampling jitter will be dependent on the pre-sampler. Data latch 1056 samples the state of signal comparator 110 based on the comparator reference 150. Sampling clock 1054, provided by clock multiplier 1052, has a frequency multiplication based on the delay line interpolation factor used in the edge sampler. The frequency multiplication is based a phase lock loop with a divider to set the multiplication ratio. Reference clock 1050 is provided by the signal acquisition engine to maintain lock between the internal time base and the phase of the frequency multiplied sampling clock. A variable phase shift on the reference clock provided to the clock multiplier can be used to maintain the correct phase relationship between the pre-sampling and following edge sampler.

It is often desirable to provide optical feedback between the transmitter and receiver to facilitate self-calibration and noise cancellation. During the modulation of the optical transmit signal, electronic noise can be generated from the large currents flowing in the transmit circuitry. These electronic transients, synchronous with the transmitted signal, cannot be removed from the return signal unless the interference is measured without the presence of the signal return. So it desirable when providing transmit feedback to also include provisions to shut-off the return signal and transmit reference allowing the characterization of the electronic interference alone. Gain control on the received signal and in the intensity of the feedback is also desirable to allow improved self-calibration.

Figure 36:
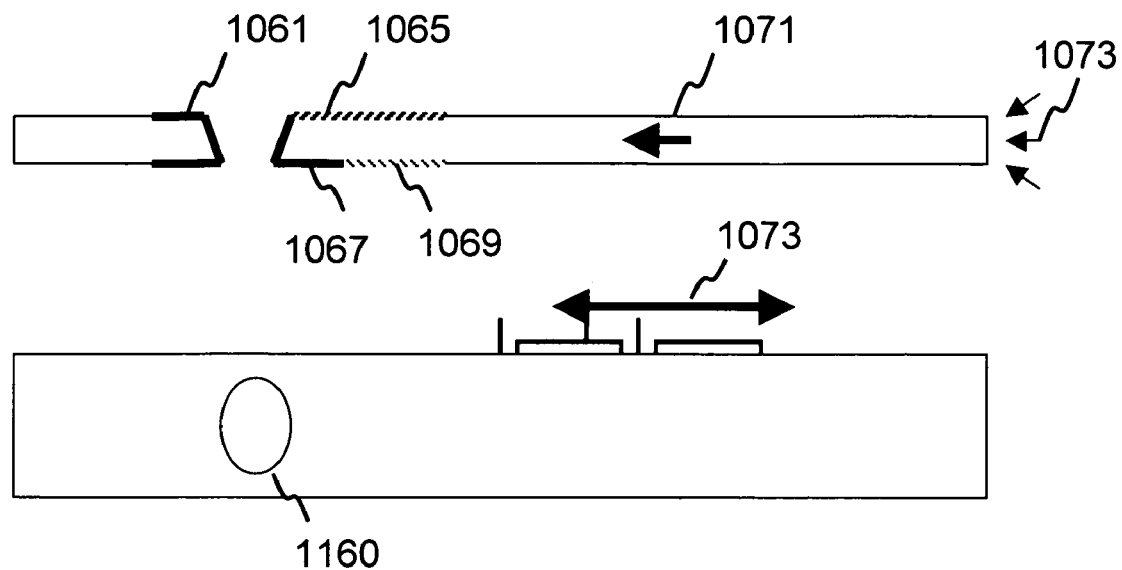
FIG. 36 shows a sliding optical waveguide used for self-calibration.

FIG. 36 shows a sliding optical waveguide used for self-calibration. It consists of a rectangular slab of transparent plastic or glass, which provides a means to vary the coupling between the transmit emitter and receive photo detector of the optical sensor. A tapered hole 1060 provides a path for the un-attenuated transmission of the receive signal through the waveguide. Light is coupled into the right end of the waveguide 1073 passes down the slab 1071 and is directed downward at output coupler 1069. The upper surface 1065 is a reflective coating used to direct upward propagating light downward towards the coupler and it has a topcoat of opaque paint preventing light transmission through the upper surface. Coating 1061 is also opaque blocking light on both the top and bottom surfaces of the slab. Coating 1067 blocks light on the bottom of the slab and it extends to the walls of the hole 1060. FIGS. 34*a-c* illustrates the application of the feedback waveguide in the optical system.

Figure 37A:
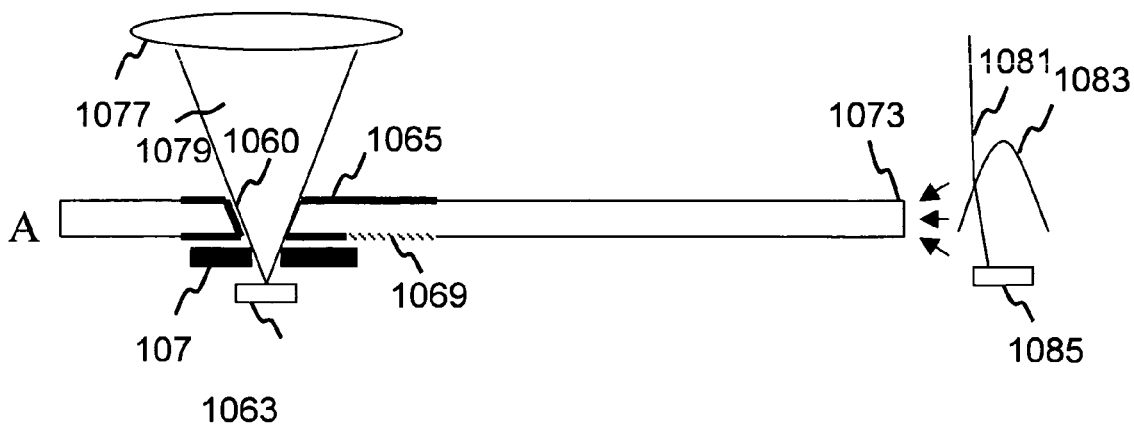
FIG. 37a shows the sliding waveguide is positioned over the detector.

FIG. 37*a* shows the sliding waveguide positioned over the detector allowing optical signal from lens 1077, forming ray bundle 1079, to pass directly to the photodiode 1063. An opaque mask 1071 is positioned directly below the waveguide and prevents light from passing to the detector from areas outside the small opening in the mask. The combination of the mask and opaque coating on the bottom side of the waveguide prevents light from the transmit reference path from reaching the detector. Light produced by optical emitter 1085 represented by optical ray 1081 is refracted by lens surface 1083 passing upward. A small portion of the light scattered off the lens surface become light coupled into the waveguide as described above. As the slider is moved to the left, the receive path becomes attenuated as the upper hole and lower mask are no longer are concentric.

Figure 37B:
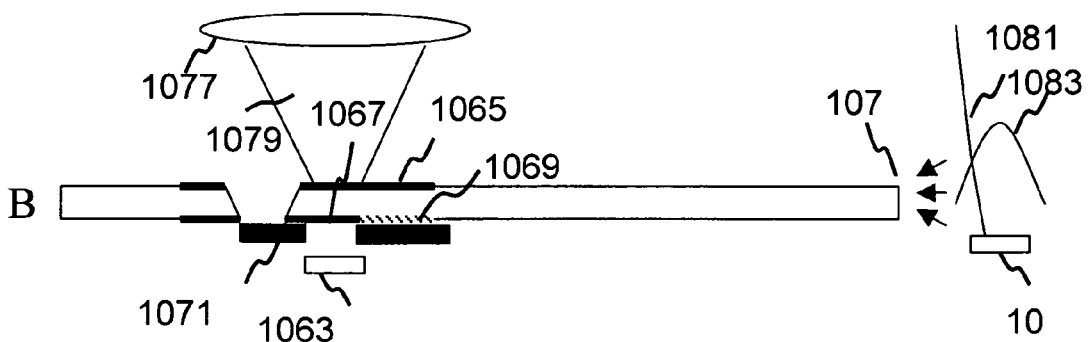
FIG. 37b shows a blocking state of the optical feedback waveguide.

FIG. 37*b* shows a blocking state of the optical feedback waveguide where both the feedback and return signals are blocked. In this case, opaque region 1061 is positioned directly over the blocking aperture preventing all light from reaching the detector. Continued movement of the slider begins to allow energy from the feedback path to reach the detector.

Figure 37C:
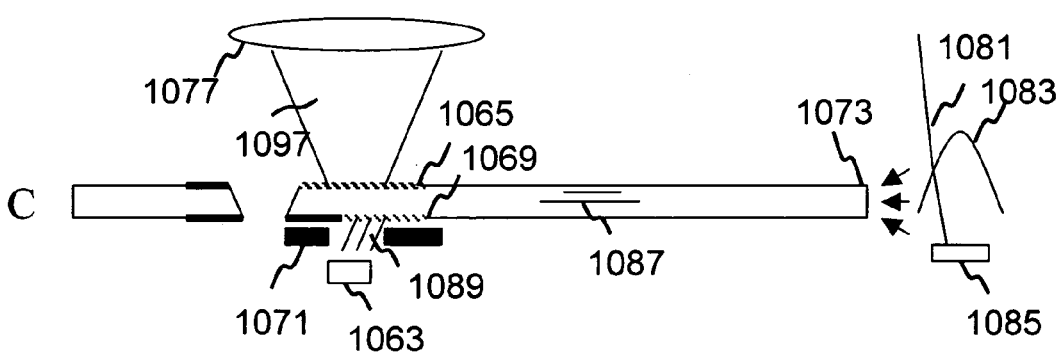
FIG. 37c shows the slider in a position allowing the injection of light from the transmit reference path.

FIG. 37*c* shows the slider in a position allowing the injection of light from the transmit reference path. Light propagating in the waveguide 1087 passes down to the region of the output coupler. Light hitting the coupler is directed downward and is shown as optical rays 1089. Portions of these rays reach the detector. Reflecting surface 1065 re-circulates optical energy propagating upward while continuing to block the energy from the received signal.

Figure 38:
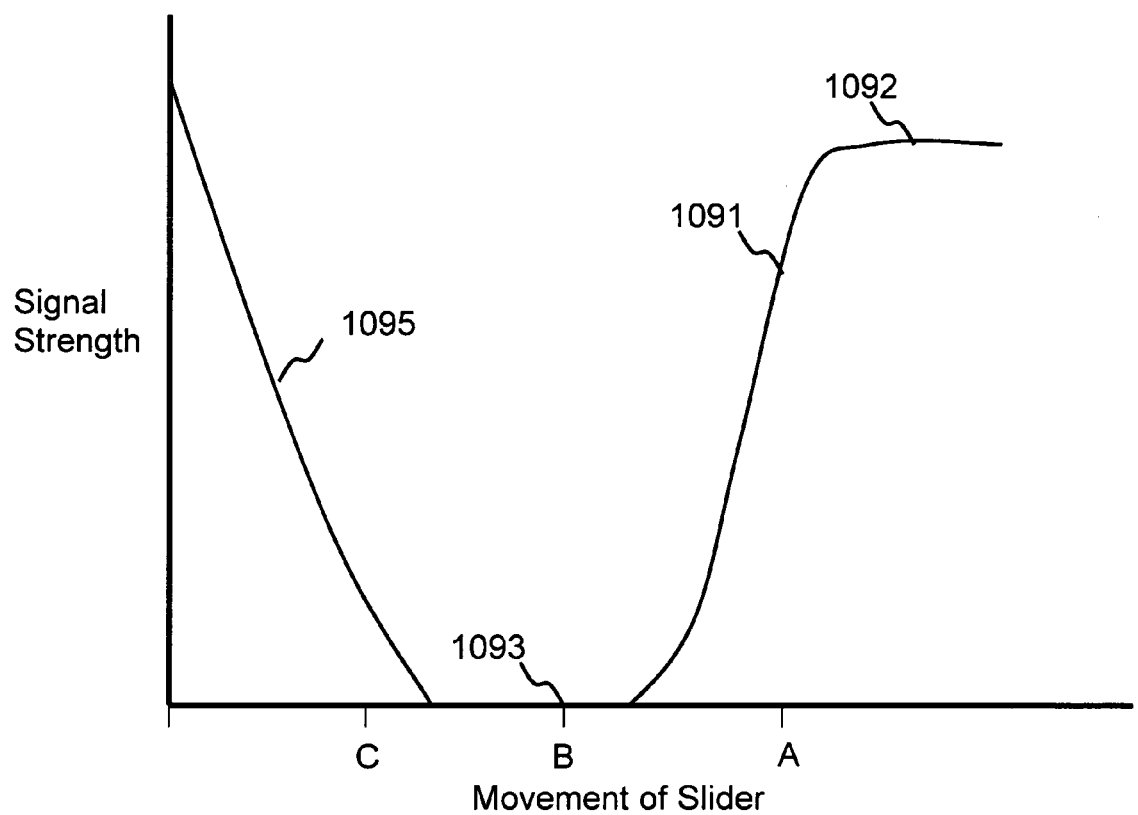
FIG. 38 shows a diagram of the variable transmission and switching of optical signals caused by slider movement.

FIG. 38 shows the variable transmission and switching of optical signals caused by slider movement. Waveform segment 1095 shows the variation in signal strength as the slider is moved from the far left hand position towards the C position. This case reflects the changing intensity of the transmit reference. Region marked 1093 is the blocked state while the rising waveform 1091 show the increased received signal level with continuing movement. Once the waveguide hole is generally positioned over the open portion of the blocking aperture 1092, minimal signal variation occurs since the most of the ray bundle is unaffected by continued movement.

In practice with the duration of a complete signal acquisition cycle of only 10's of milliseconds, the slider can be moved continuously over a 0.5 to 1 second interval without seeing a significant change in the measured transmit reference or received signal intensity. As the slider moves, received signal acquisition, the acquisition of the feedback transmit reference and the measurement of the transmit noise are all measured. An optical encoder can be used to accurately measure the position of the slider or a mechanical switch can be used to identify the extreme positions of the slider in combination with measuring the reference and return signal strengths at the receiver. The small physical size of the ray bundle near the detector (1 to 2 mm) allows the full cycle of operation (transmit reference, blocking and received signal) to occur over 3 to 4 millimeters of travel. This small amount of travel enables the slider activation by the pressing a relatively long-travel button eliminating the cost and complexity of an electro-mechanical actuator. Alternatively, the slider can be moved by linear solenoid, or through translation of rotational motion of a motor mechanically into linear motion of the waveguide. In a third embodiment the linear waveguide can be replaced with a continuously rotating disk driven by a DC or brushless AC motor.

Figure 39:
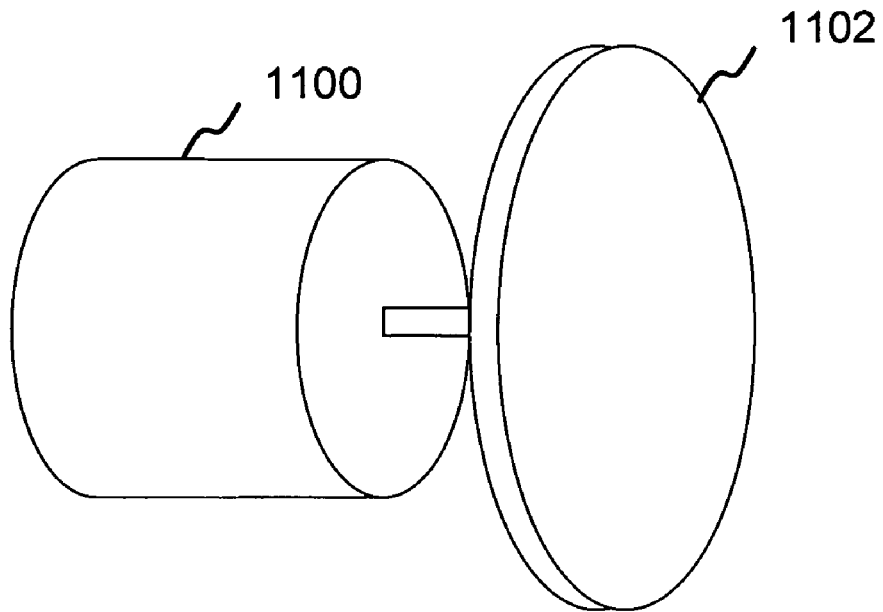
FIG. 39 shows a wheel embodiment of the transmit feedback waveguide allowing repetitive distance measurements.
Figure 39:
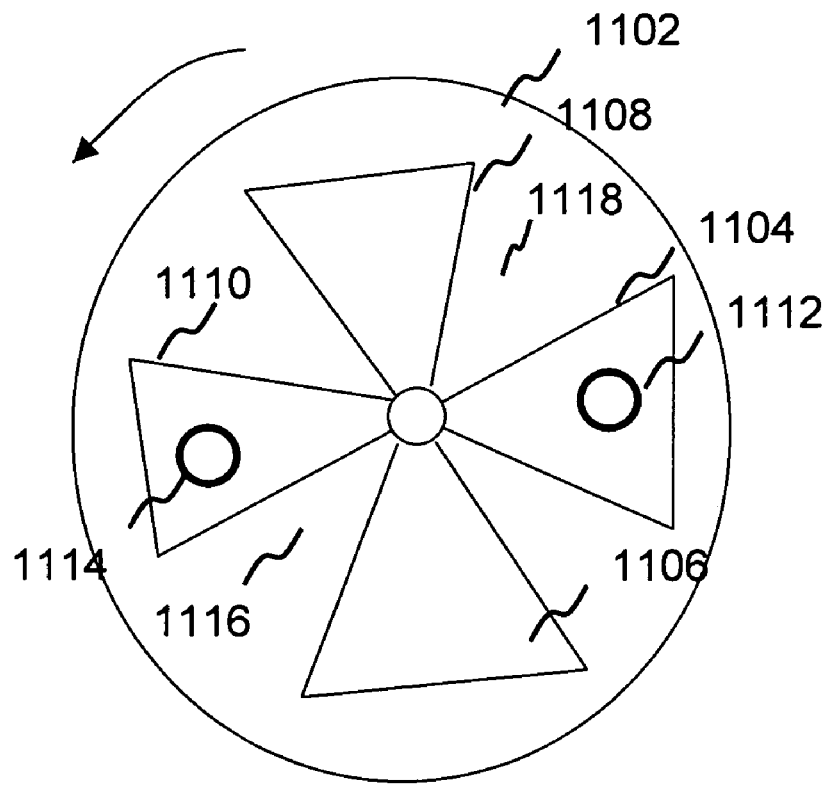

FIG. 39 shows a wheel embodiment of the transmit feedback waveguide allowing repetitive distance measurements. Wheel 1102 is driven by motor 1100 producing continuous rotation. Circular feature 1112 represents an opening in a mask allowing energy to pass directly to a detector located below. Triangular aperture 1104 represents a region allowing all or a portion of the received signal energy to pass to the detector. On the opposite side marked 1110 is also an opening allowing transmit energy emitted from aperture 1114 to pass to the transmit optics located above. In this state, energy is allowed to pass unencumbered by the wheel. Triangular regions 1116 and 1118 allow energy to pass from the transmit aperture to the receiver through the wheel. These two regions are opaque when viewed from the top of the wheel; blocking the received signal and preventing transmit energy from exiting the system. In least one of the regions between the spokes energy can be blocked for both the transmit reference and received paths allowing the measurement of the transmit noise baseline. The transmission characteristics of the triangular apertures can also be patterned to allow the gradual variation of signal or reference intensities allowing the implementation of automatic gain control on both paths. Since there are two opposing apertures allowing signal passage two measurements can be made on each rotation. The rotating wheel can be used to provide scanning of transmit and receive beams by modifying triangular region 1110 and 1104 to provide diffractive or refractive steering of the ray bundles. Since alternating regions of the wheel would cause steering in the opposite directions the direction of optical propagation can be reversed between the transmit and receive portions in combination with a retro-reflecting optic on one side to produce of the movements two fields of view in the same direction.

I claim:

1. A sensing device configured to synchronously emit one or more modulated electro-magnetic signals into a transmission channel to produce a receive signal based on an interaction of the emitted signal with an object, the sensing device comprising:
    a detector to convert said electromagnetic signal into an electrical signal; and
    a signal sampler to convert the signal into binary logic states at successive sample points based on a detection reference;
    an edge detector to detect a positive or negative edge transition at a sample point based on the previous and present logic state of the signal sampler, wherein said edge detector uses at least 2 consecutive signal samples to determine edge state;
    a summing element to accumulate the number of rising and falling edges associated with a given sample point; and
    a signal reconstruction module configured to use the difference between the number of rising and falling edges at sample points to estimate a signal slope.

2. The device according to claim 1, wherein the signal sampler includes a signal comparator and a clocked serial to parallel converter.

3. The device according to claim 2, wherein the serial to parallel convertor comprises a tapped delay line and associated sampling latches.

4. The device according to claim 3, further comprising a clocked data synchronizer situated prior to the tapped delay line to sample the comparator output roughly 180 degrees out of phase to the nominal sampling interval.

5. The device according to claim 3, wherein the tapped delay line comprises at least two parallel delay lines coupled to inverted and non-inverted signal comparator outputs.

6. The device according to claim 5, where the states of associated taps of the delay line are configured to be decoded to cancel the effect of asymmetric propagation delays on the effective sample points of rising and falling edge transitions.

7. The device according to claim 1, wherein said summing element includes a series of adders and a memory.

8. The device according to claim 7, wherein the number of required adders is reduced by alternatively processing rising and falling edges with skipped edge data passed forward to the next summing cycle using a bit storage pipeline.

9. The device according to claim 1, wherein the edge difference is normalized based on a sum of rising and falling edges to produce a transfer function with a value between minus one and plus one.

10. The device according to claim 9, wherein if the normalized slope estimate of the transfer function exceeds a value in the range of +/−0.9 to 0.95 the signal slope is based on the sum of rising and falling edges multiplied by a large signal scale factor.

11. The device according to claim 10, wherein the large signal scaling factor is based on the mean of the slope transfer function divided by the corresponding sum of the rising and falling edges at points bordering the large signal transition.

12. The device according to claim 11, wherein the border between the small signal and large signal is based on normalized transfer function values in the range of +/−0.8 to 0.95.

13. The device according to claim 1, wherein the detection reference is adjustable.

14. The device according to claim 13, wherein the detection reference is configured to be swept through the signal envelope.

15. The device according to claim 14, wherein the detection reference sweep is based on measured signal strength.

16. The device according to claim 1, wherein the signal reconstruction module further comprises:
    a past edge sum register to store previous edge sum values; and
    a present edge sum register to store present edge sum value values; and
    a detection reference storage register to store the last threshold value; and
    an acquisition status flag register to disable the continued updating of the past and present edge sum registers; and
    a comparison device to determine when a present sum is less than the pass sum value to inhibit additional updates of associated edge storage and detection reference registers; and
    a signal estimator configured to provide signal amplitude estimate, wherein the signal amplitude is based on a interpolated threshold level; and
    a detection reference generator.

17. The device according to claim 16, wherein the interpolation calculation is based on the last stored detection threshold level and the edge sum value divided by the difference in the past and present edge sum values.

18. The device according to claim 17, wherein the output of the detection reference generator is configured to follow a ramp waveform.

19. The device according to claim 1, wherein the signal reconstruction module is configured to convert the slope into an amplitude value.

* * * * *